(12) United States Patent
Moores, Jr.

(10) Patent No.: US 6,905,299 B2
(45) Date of Patent: Jun. 14, 2005

(54) METHOD AND APPARATUS FOR FASTENING STEEL FRAMING WITH A HARPOON NAIL

(75) Inventor: Robert G. Moores, Jr., Reisterstown, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/780,072

(22) Filed: Feb. 17, 2004

(65) Prior Publication Data

US 2004/0161318 A1 Aug. 19, 2004

Related U.S. Application Data

(63) Continuation of application No. 10/176,998, filed on Jun. 21, 2002, now Pat. No. 6,719,512.
(60) Provisional application No. 60/299,931, filed on Jun. 21, 2001, provisional application No. 60/299,954, filed on Jun. 21, 2001, provisional application No. 60/299,899, filed on Jun. 21, 2001, and provisional application No. 60/299,903, filed on Jun. 21, 2001.

(51) Int. Cl.[7] ............................ F16B 15/00; F16B 15/06
(52) U.S. Cl. ........................ 411/478; 411/477; 411/456; 411/451.3; 411/451.4
(58) Field of Search ................................ 411/456, 448, 411/451.3, 477, 913, 450, 451.4, 451.5, 478, 508–510; 173/132; 227/151

(56) References Cited

U.S. PATENT DOCUMENTS

| | | | |
|---|---|---|---|
| 368,687 A | * 8/1887 | Rogers | 411/455 |
| 549,555 A | * 11/1895 | White | 411/456 |
| 1,444,618 A | 2/1923 | Levingston | |

(Continued)

FOREIGN PATENT DOCUMENTS

| | | |
|---|---|---|
| DE | 155 135 C | 10/1904 |
| DE | 308 681 C | 10/1918 |
| DE | 369 395 C | 2/1923 |

(Continued)

OTHER PUBLICATIONS

International Search Report for PCT/US02/19536 mailed Sep. 5, 2002.
International Search Report for PCT/US02/19626 mailed Sep. 18, 2002.
International Search Report for PCT/US02/19627 mailed Sep. 16, 2002.
International Search Report for PCT/US02/19727 mailed Sep. 16, 2002.
International Search Report for PCT/US02/19757 mailed Feb. 18, 2003.
International Search Report for PCT/US02/20063 mailed Jan. 29, 2003.

*Primary Examiner*—Robert J. Sandy
*Assistant Examiner*—Katherine Mitchell
(74) *Attorney, Agent, or Firm*—Harness, Dickey & Pierce, P.L.C.

(57) ABSTRACT

A harpoon nail having two or more sets of teeth on opposite sides of fingers that deform while penetrating the framing members. The teeth engage with a bottom surface to fasten the framing members together. A piercing nail having sets of teeth on two edges penetrates through framing members and the teeth engage with a bottom surface to fasten the framing members together. A piercing nail with a spring member that deforms as the nail penetrates through framing members engages with a bottom surface to fasten the framing members together. A self-locking nail having two members that move relative to one another when penetrating through framing members fastens the framing members together.

22 Claims, 24 Drawing Sheets

U.S. PATENT DOCUMENTS

| | | | |
|---|---|---|---|
| 1,912,222 A | | 5/1933 | Heyman |
| 1,972,119 A | * | 9/1934 | Wernhardt ................. 411/456 |
| 2,006,813 A | | 7/1935 | Norwood |
| 2,178,187 A | | 10/1939 | Sake |
| 2,410,047 A | | 10/1946 | Burrows et al. |
| 2,429,239 A | | 10/1947 | Rogers |
| 2,719,452 A | * | 10/1955 | Jones ........................ 411/456 |
| 2,944,262 A | | 7/1960 | Richman |
| 2,994,243 A | | 8/1961 | Langstroth |
| 3,322,017 A | | 5/1967 | Dufficy |
| 3,332,311 A | | 7/1967 | Schulz |
| 3,722,280 A | | 3/1973 | Van Greuingen |
| 3,882,755 A | * | 5/1975 | Enstrom .................... 411/456 |
| 3,925,875 A | | 12/1975 | Doke |
| 3,964,680 A | * | 6/1976 | Arthur ....................... 238/366 |
| 4,025,029 A | | 5/1977 | Kotas et al. |
| 4,167,885 A | * | 9/1979 | Paskert et al. .............. 411/478 |
| 4,183,239 A | | 1/1980 | Stubbings |
| 4,203,193 A | * | 5/1980 | Arthur ..................... 29/525.03 |
| 4,218,953 A | | 8/1980 | Haytayan |
| 4,247,219 A | | 1/1981 | Ausprung |
| 4,354,782 A | * | 10/1982 | Newport ..................... 411/61 |
| 4,393,551 A | * | 7/1983 | Wollar et al. .................. 24/627 |
| 4,402,641 A | | 9/1983 | Arff |
| 4,511,296 A | | 4/1985 | Stol |
| 4,601,625 A | | 7/1986 | Ernst et al. |
| 4,708,552 A | * | 11/1987 | Bustos et al. ............... 411/80.1 |
| 4,787,795 A | | 11/1988 | Kraus |
| 4,810,150 A | | 3/1989 | Matsukane et al. |
| 4,840,523 A | | 6/1989 | Oshida |
| 4,902,182 A | | 2/1990 | Lewis |
| 5,030,051 A | | 7/1991 | Kaneko et al. |
| 5,207,750 A | | 5/1993 | Rapata |
| 5,240,361 A | | 8/1993 | Armstrong et al. |
| 5,253,965 A | | 10/1993 | Angel |
| 5,259,689 A | | 11/1993 | Arand et al. |
| 5,323,632 A | | 6/1994 | Shirasaka et al. |
| 5,333,483 A | | 8/1994 | Smith |
| 5,375,957 A | | 12/1994 | Golledge |
| 5,376,097 A | | 12/1994 | Phillips |
| 5,460,317 A | | 10/1995 | Thomas et al. |
| 5,567,101 A | | 10/1996 | Martin |
| 5,658,110 A | | 8/1997 | Kraus |
| 5,718,142 A | | 2/1998 | Ferraro |
| 5,775,860 A | | 7/1998 | Meyer |
| 5,794,835 A | | 8/1998 | Colligan et al. |
| 5,829,664 A | | 11/1998 | Spinella et al. |
| 5,829,817 A | | 11/1998 | Ge |
| 5,855,099 A | | 1/1999 | Hoffman |
| 5,975,406 A | | 11/1999 | Mahoney et al. |
| 6,023,898 A | | 2/2000 | Josey |
| 6,045,028 A | | 4/2000 | Martin et al. |
| 6,067,839 A | | 5/2000 | Xie |
| 6,095,395 A | | 8/2000 | Fix, Jr. |
| 6,102,636 A | | 8/2000 | Geise |
| 6,168,066 B1 | | 1/2001 | Arbegast |
| 6,206,268 B1 | | 3/2001 | Mahoney |
| 6,273,656 B1 | | 8/2001 | Cleland et al. |
| 6,276,644 B1 | | 8/2001 | Jennings et al. |
| 6,354,683 B1 | | 3/2002 | Benbow |
| 6,398,883 B1 | | 6/2002 | Forrest et al. |
| 6,705,147 B2 | | 3/2004 | Judge |
| 2002/0014516 A1 | * | 2/2002 | Nelson et al. ........... 228/112.1 |
| 2002/0027156 A1 | | 3/2002 | Coletta et al. |
| 2002/0071741 A1 | | 6/2002 | Oswald |
| 2002/0125297 A1 | * | 9/2002 | Stol et al. ................ 228/112.1 |
| 2003/0010805 A1 | * | 1/2003 | Nelson et al. ............... 228/2.1 |
| 2003/0012620 A1 | * | 1/2003 | O'Banion et al. .......... 411/386 |
| 2003/0116609 A1 | | 6/2003 | Dracup et al. |

FOREIGN PATENT DOCUMENTS

| | | |
|---|---|---|
| DE | 31 47 430 A | 6/1983 |
| DE | 2557845 A1 | 6/1997 |
| DE | 199 34 998 A | 2/2001 |
| FR | 2 595 609 | 9/1987 |
| FR | 2651283 | 8/1989 |
| FR | 2745863 | 3/1996 |
| GB | 608 373 A | 9/1948 |
| GB | 2306366 A | 5/1997 |
| JP | 59 185529 A | 10/1984 |
| WO | WO 92 03664 A | 3/1992 |
| WO | WO 01 38746 A | 5/2001 |
| WO | WO 01 65125 A | 9/2001 |
| WO | WO 03/001075 | 1/2003 |

* cited by examiner

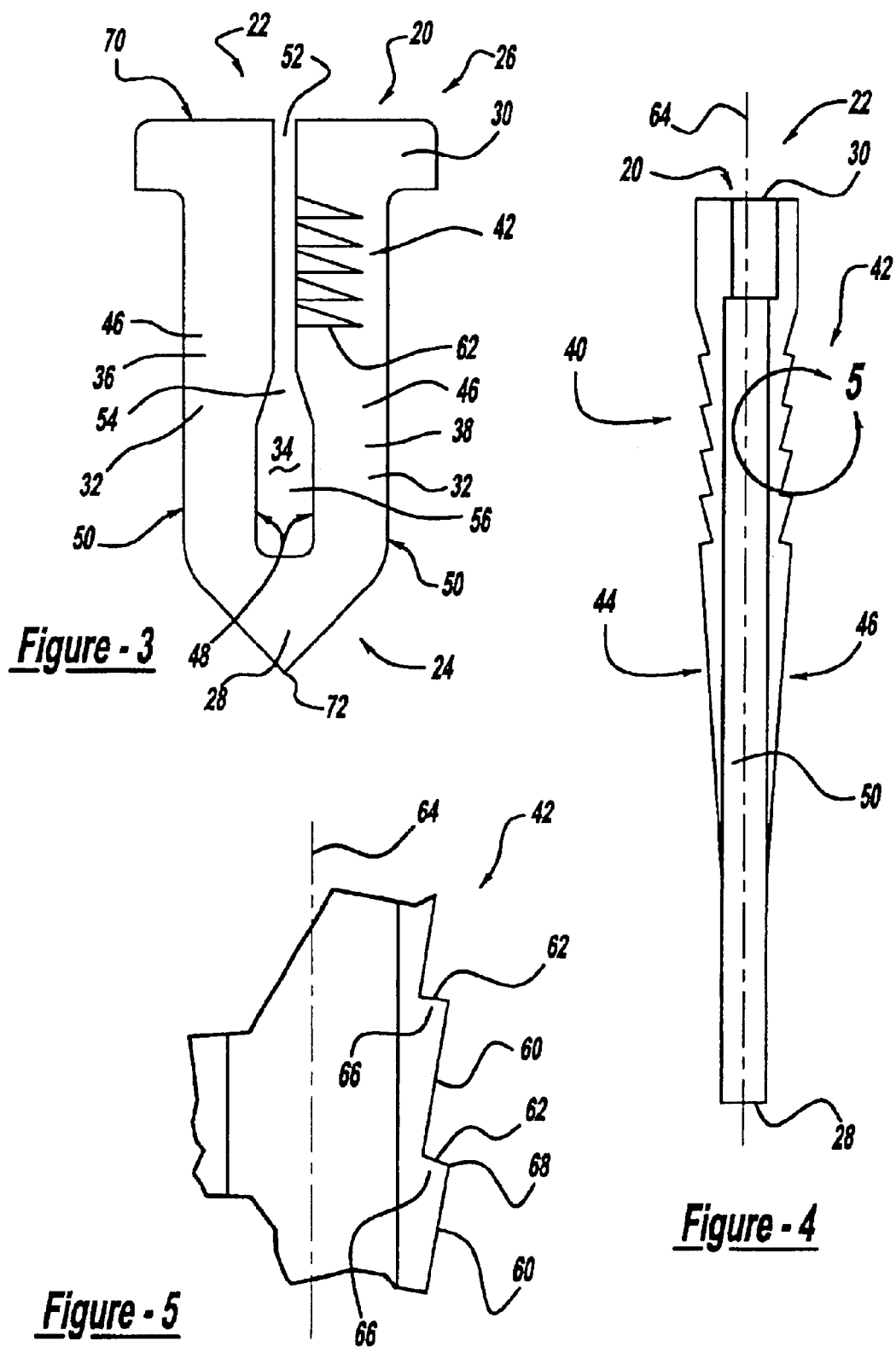

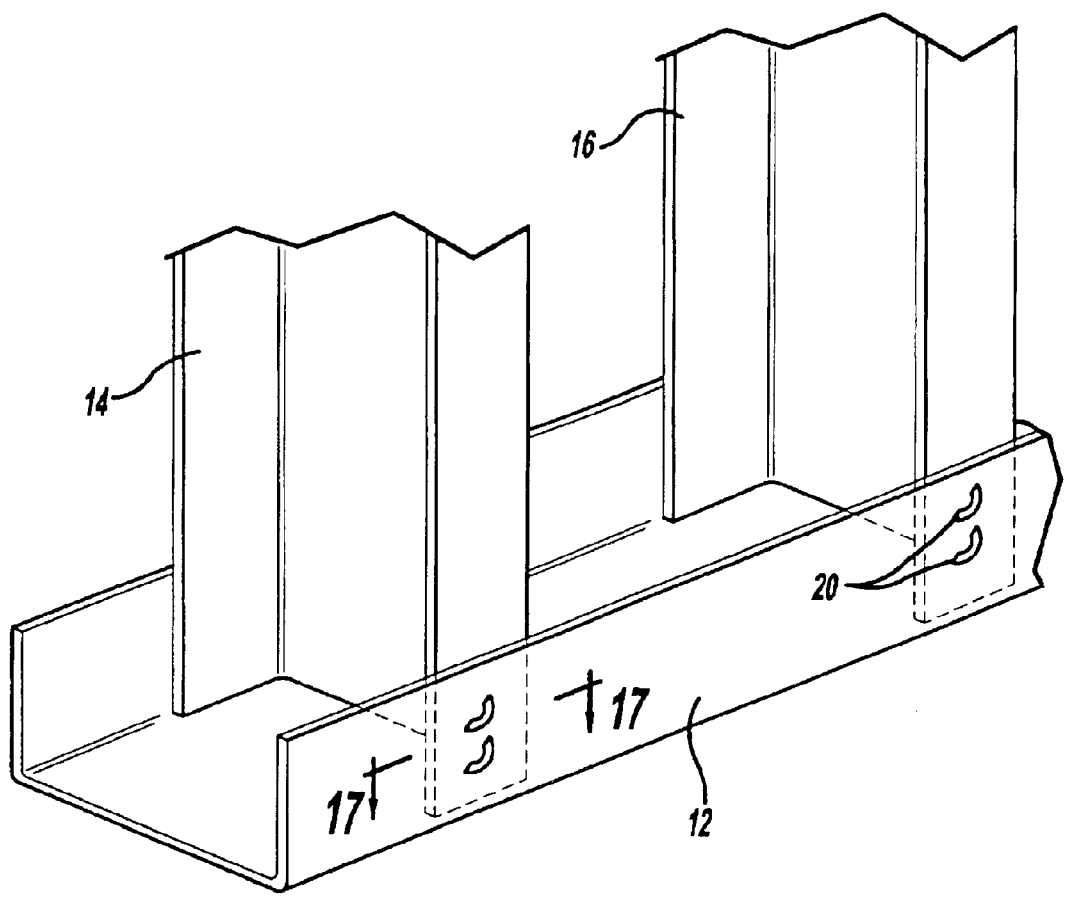
*Figure - 12*
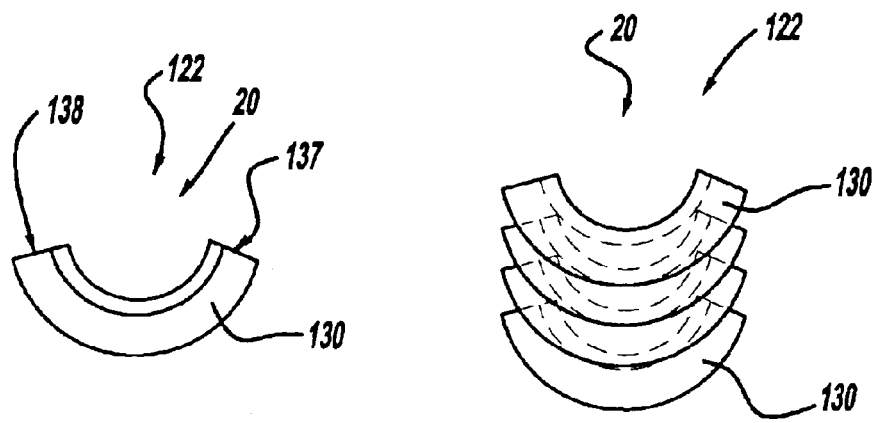
*Figure - 13*   *Figure - 14*

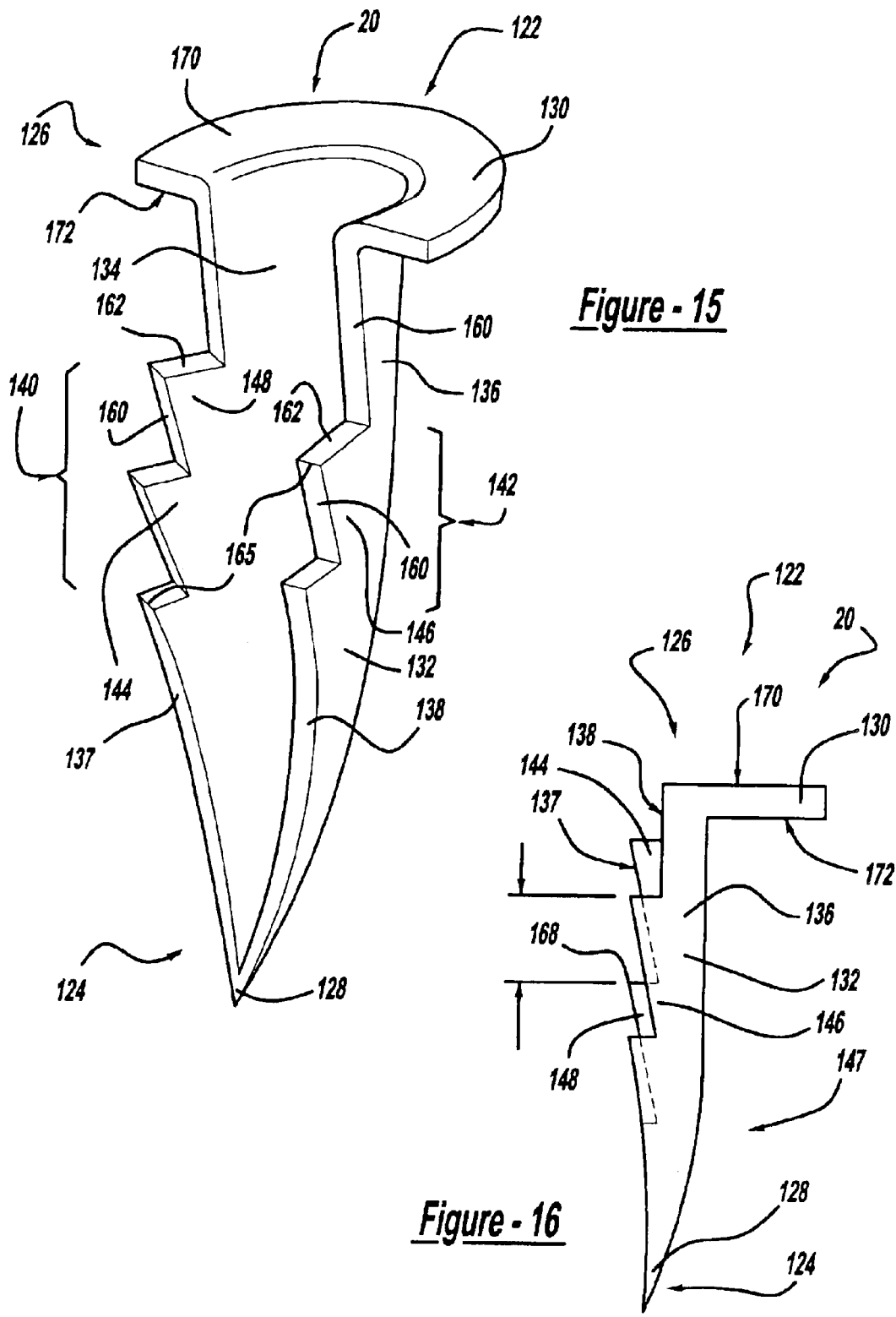

METHOD AND APPARATUS FOR FASTENING STEEL FRAMING WITH A HARPOON NAIL

CROSS-REFERENCE TO RELATED APPLICATIONS

This application is a continuation of U.S. patent application Ser. No. 10/176,998 filed on Jun. 21, 2002, now issued as U.S. Pat. No. 6,719,512 issued Apr. 13, 2004, which claims the benefit of U.S. Provisional Application Nos. 60/299,931, filed Jun. 21, 2001, 60/299,954, filed Jun. 21, 2001, 60/299,899, filed Jun. 21, 2001, and 60/299,903, filed Jun. 21, 2001.

FIELD OF THE INVENTION

The present invention relates generally to steel framing and, more particularly, to an improved cost-effective method for fastening steel framing.

BACKGROUND OF THE INVENTION

Steel framing is revolutionizing the construction industry. Steel is a high quality framing material that will not shrink, warp, or attract termites and other wood boring insects. In recent years, the price of steel has become more competitive with wood and other construction materials. However, despite its advantages, steel framing has not become prevalent in the residential construction industry. The lack of a quick and cost effective technique for fastening steel framing members has prevented steel framing from emerging as the predominant building material in residential construction.

Therefore, it is desirable to provide a quick and cost-effective technique for fastening steel members. It is envisioned that the steel fastening technique will be comparable in speed to an air nailer used to fasten wood materials. It is further envisioned that the steel fastening technique will provide a minimal gap between steel framing members, a pullout force of at least 216 lb., a shear force of at least 164 lb., as well as cause minimal destruction of any galvanize coating on the steel framing members.

SUMMARY OF THE INVENTION

The present invention discloses various nails and techniques that can be used to fasten two or more framing members together and provide the required strengths discussed above.

In a first aspect in accordance with the present invention, a harpoon nail is disclosed. The harpoon nail has two or more sets of teeth on opposite sides and a slot that allows fingers to twist or compress so that the sets of teeth can engage a bottom surface of adjacent framing members and fasten the framing members together.

In a second aspect in accordance with the present invention, a piercing nail having deformable ears is disclosed. Piercing nail has sets of teeth on edges that separate interior and exterior surfaces of piercing nail and form ears. The ears can resiliently deform as the piercing nail penetrates through framing members and spring out after passing through the framing members to facilitate engagement of teeth with a bottom surface of adjacent framing members to fasten the framing members together.

In a third aspect in accordance with the present invention, a piercing nail with spring member is disclosed. The piercing nail has one or more spring members that deform as the spring member passes through adjacent framing members and expands after exiting the framing members. The spring members engage with a bottom surface of the framing members and fastens the framing members together.

In a forth aspect in accordance with the present invention, a self-locking nail is disclosed. The self-locking nail has two members with elongated portions, angular portions and flange portions. As the self-locking nail penetrates through adjacent framing members the angular portions move toward each other and cause the elongated portions to separate and engage the framing members and fastens the framing members together.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 3 and 4 are respective front and side plan views of the first preferred embodiment of the harpoon nail in accordance with the present invention;

FIG. 5 is a fragmentary side view of the harpoon nail of FIG. 4 illustrating the teeth formed along the stem section in accordance with the present invention;

FIG. 12 is a fragmentary perspective view of a steel framing member have two additional steel framing members fastened thereto by a piercing nail in accordance with the present invention;

FIG. 13 is a top view of an exemplary piercing nail in accordance with the present invention;

FIG. 14 is a top view of a plurality of piercing nails nested together in accordance with the present invention;

FIG. 15 is a perspective view of the piercing nail in accordance with the present invention;

FIG. 16 is a side view of the piercing nail illustrating the staggered teeth design in accordance with the present invention;

DETAILED DESCRIPTION OF THE PREFERRED EMBODIMENTS

Figure 1:
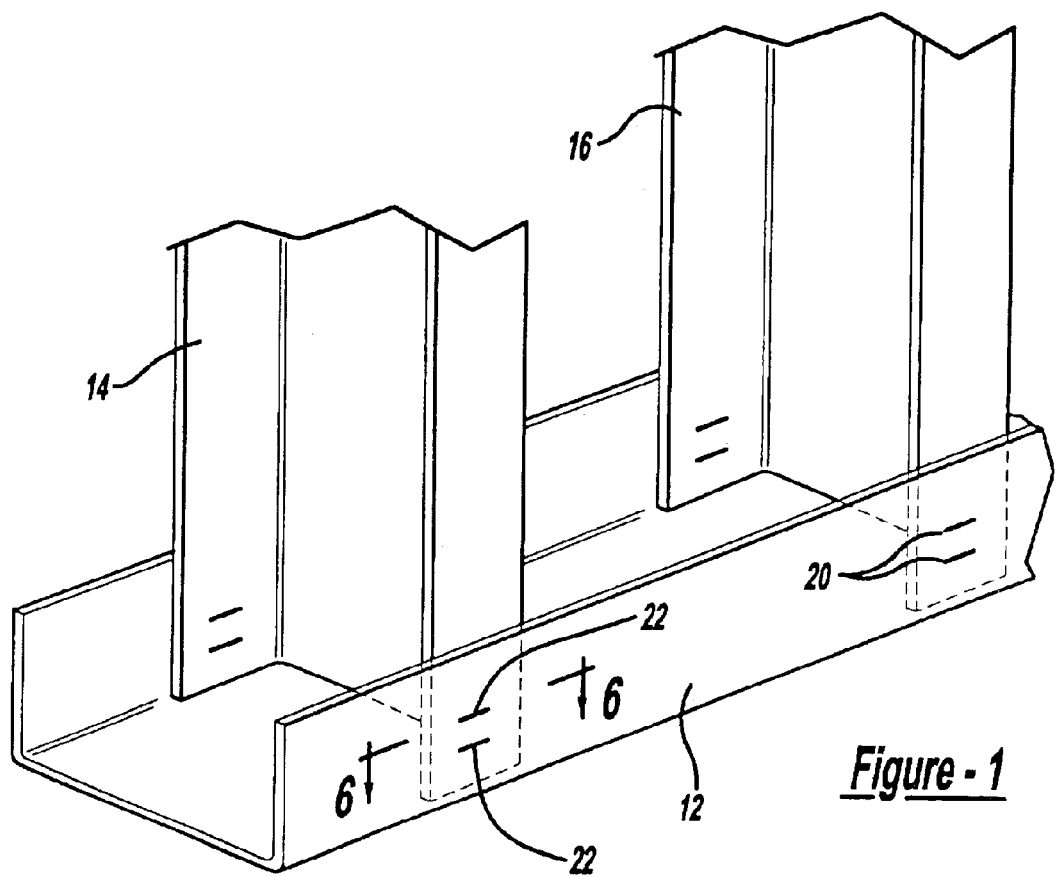
FIG. 1 is a fragmentary perspective view of a steel framing member having two additional steel framing members fastened thereto with harpoon nails in accordance with the present invention.

The following description of the different aspects and preferred embodiments of the present invention is merely exemplary in nature and is in no way intended to limit the invention, its application, or uses.

Referring to FIGS. 1, 12, 18 and 30, a fragmentary perspective view of a longitudinal steel framing member 12 having two upright steel framing members 14 and 16 fastened thereto is shown. Each C-shaped framing member includes a bottom wall and two side walls having a thickness in the range from 0.018" to 0.071". Additionally, each framing member may range from 33 ksi to 80 ksi as is well known in the art. As will be more fully described below, one or more fasteners 20 may be used to join the upright framing members 14 and 16 to the longitudinal steel framing member 12. While the following description is provided with reference to this particular configuration, it is readily understood that the fastening techniques of the present invention are applicable to any two or more adjacent members made of steel or other material having similar attributes to those of steel.

In accordance with a first aspect of the present invention, fasteners 20 are harpoon nails 22. A first preferred embodiment of harpoon nail 22 of the present invention is shown in FIGS. 2–6. One or more harpoon nails 22 may be used to fasten together the framing members. Harpoon nail 22 has axially opposite first and second ends 24 and 26. First end 24 has a tip 28 and second end 26 has a head 30. A stem section 32 extends axially between head 30 and tip 28. A slot 34 extends axially from second end 26 toward first end 24 along a substantial portion of an axial length of nail 22. Slot 34 separates head and stem sections 30 and 32 to form first and second finger members 36 and 38. Finger members 36 and 38 are elastic and/or resilient so that they can be flexed into different orientations and have a tendency to return to their original orientation, as will be described in more detail below. First and second sets of teeth 40 and 42 are located on the respective first and second finger members 36 and 38.

Finger members 36 and 38 have opposite first and second surfaces 44 and 46 that are separated by inner and outer side walls 48 and 50. Inner side walls 48 of first and second finger members 36 and 38 face one another and define slot 34. First and second surfaces 44 and 46 on each finger member 36 and 38 extend between the inner and outer side walls 48 and 50 and define a width of each finger member 36 and 38. Inner and outer side walls 48 and 50 define a thickness of finger members 36 and 38.

As can best be seen in FIG. 3, slot 34 has a narrow section 52 where inner side walls 48 are generally parallel, an expanding section 54 where inner side walls 48 expand radially outwardly as side wall 48 extends from narrow section 52 toward tip 28, and a wide section 56 with a curved end that defines the joining of inner side walls 48 of first and second finger members 36 and 38. Slot 34 allows finger members 36 and 38 to push radially inwardly towards one another as nail 22 is inserted through the framing members. Slot 34 also allows finger members 36 and 38 to be twisted relative to one another to facilitate the insertion of nail 22 through the framing members without engaging with first and second sets of teeth 40 and 42, as will be described in more detail below.

As shown in FIG. 3, second set of teeth 42 extend along second surface 46 a portion of the width of second finger member 38 adjacent inner side wall 48. Likewise, first set of teeth 40 (shown in FIGS. 4 and 6) extend along first surface 44 a portion of the width of first finger member 36 adjacent inner side wall 48.

Referring now to FIG. 5, details of the teeth that comprise the sets of teeth 40 and 42 can be seen. The teeth are formed from axial sections 60 and radial sections 62. Axial sections 60 are angled relative to an axial axis 64 so that axial sections 60 are not parallel to axial axis 64. Axial sections 60 and radial sections 62 are substantially perpendicular to one another. Each tooth 66 of the sets of teeth 40 and 42 has a leading edge 68 that is defined by an intersection of an axial section 60 and a radial section 62. Leading edge 68 is preferably sharp so that leading edge 68 can grip the framing members and inhibit removal of nail 22, as will be described in more detail below. Teeth 66 are axially spaced from head 30 varying distances to accommodate varying thicknesses of the framing members. That is, by having teeth 66 located at varying distances, the pull out distance or "play" can be minimized. The pull out distance or play is defined as the difference between the combined thickness of the framing members and the distance between a bottom surface of head 30 and the tooth 66 that engages with an opposite side of the framing members. Preferably, the teeth 66 are spaced axially at distances that accommodate various standardized thicknesses and combinations of framing members of these various thicknesses while minimizing the pull out or play. To increase the frequency at which a tooth 66 occurs at a unique axial distance from head 30, first set of teeth 40 can be staggered from second set of teeth 42 so that each tooth 66 of first and second sets of teeth 40 and 42 occurs at a unique axial distance from head 30.

Figure 2:
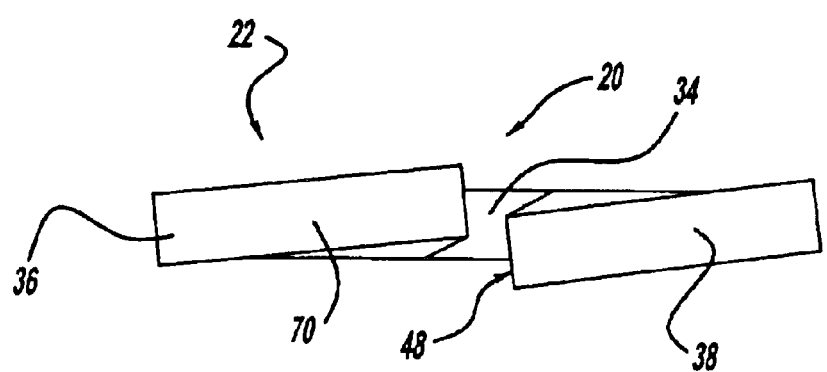
FIG. 2 is a top view of a first preferred embodiment of a harpoon nail in accordance with the present invention.
Figure 6:
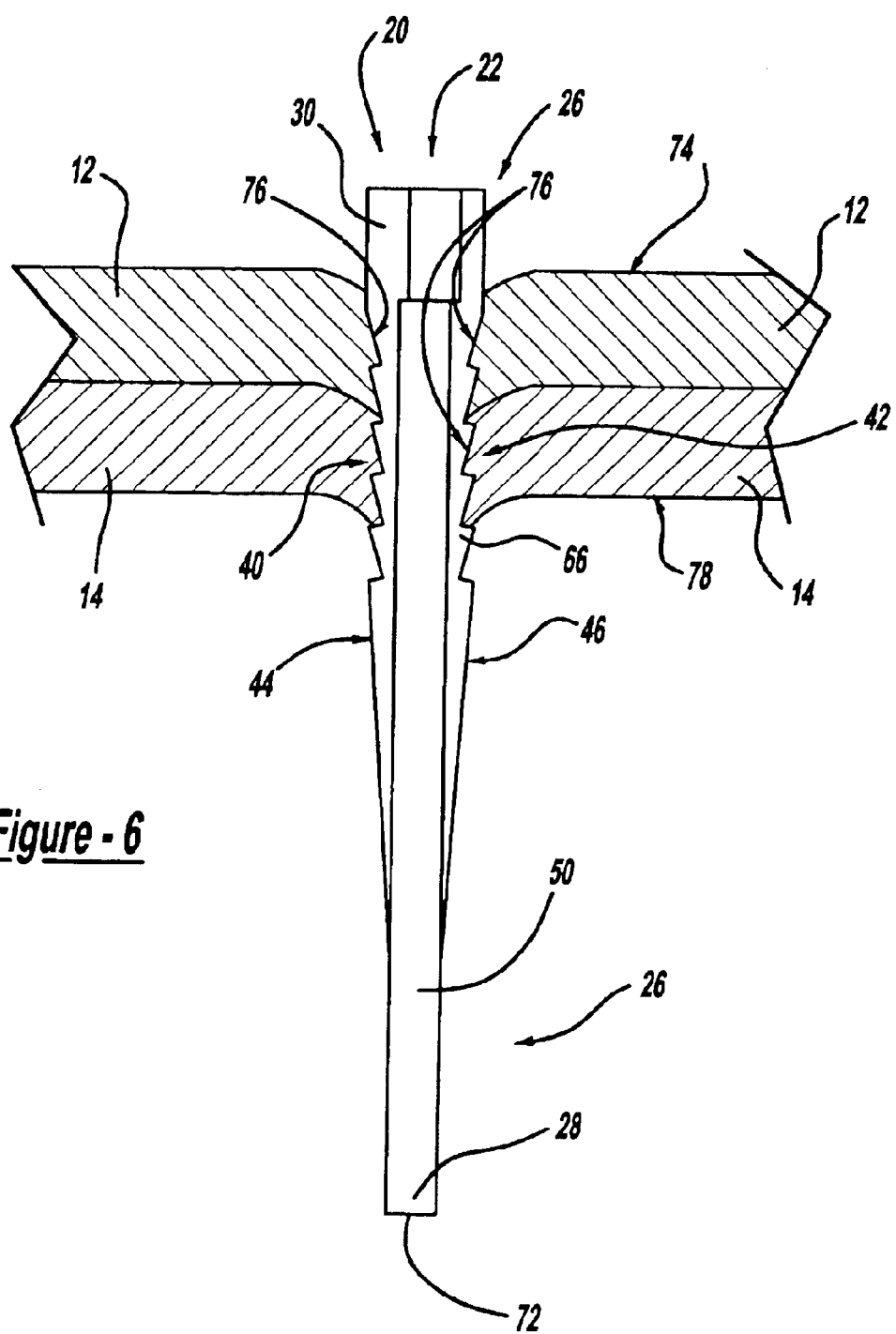
FIG. 6 is a cross-sectional view, taken along line 6—6 of FIG. 1, illustrating the first embodiment of the harpoon nail driven through two steel members in accordance with the present invention.

As can best be seen in FIGS. 2 and 4, first and second finger members 36 and 38 are substantially coplanar at tip 28 and offset at head 30. The offset of first and second finger members 36 and 38 at head 30 allow finger members 36 and 38 to be twisted relative to one another to be generally coplanar for insertion through the framing members without first and second sets of teeth 40 and 42 engaging the framing members during insertion. The elastic or resilient nature of the finger members 36 and 38 will cause the finger members 36 and 38 to attempt to return to their offset state when the force twisting them to be generally coplanar is removed.

Head 30 has a generally flat surface 70 to facilitate application of a driving force on nail 22. Head 30 is configured to be driven by an air nailer or other well known ram-type devices, such as the one shown in FIG. 39. Tip 28 comes to a point 72 that is configured to facilitate piercing the framing members so that nail 22 can penetrate through the framing members in response to the driving force.

Operation of nail 22 to fasten framing members together will now be described. Tip 28 of nail 22 is positioned adjacent an outer surface 74 of two or more adjacent framing members. For example, tip 28 can be positioned adjacent framing member 12 which is adjacent framing member 14. A driving force is applied to head 30 to cause tip 28 and stem 32 to penetrate through framing members 12 and 14. Concurrently with applying the driving force, first and second finger members 36 and 38 are twisted relative to one another so that finger members 36 and 38 are generally coplanar at head 30. The twisting of finger members 36 and 38 can be accomplished by passing nail 22 through a guide or channel as nail 22 is penetrating framing members 12 and 14, or by other mean as will be apparent to those skilled in the art. Nail 22 is inserted through framing members 12 and 14 until head 22 contacts outer surface 74 of framing member 12. The shape of head 30 prevents head 30 from passing through framing members 12 and 14 in response to the driving force. Because the finger members 36 and 38 are twisted relative to one another to be generally coplanar during the insertion process, sets of teeth 40 and 42 do not engage with inner surfaces 76 of framing members 12 and 14 during the insertion process. After nail 22 has been inserted through framing members 12 and 14, finger members 36 and 38 are released so that they have a tendency to return to their original offset state. The attempt of finger members 36 and 38 to return to their offset state causes one or both of first and second sets of teeth 40 and 42 to engage a bottom surface 78 of framing member 14. Engagement of first and/or second set of teeth 40 and 42 with bottom surface 78 inhibits removal of nail 22 and holds steel framing members 12 and 14 between head 30 and first and/or second sets of teeth 40 and 42. Thus, nail 22 can be used to fasten two or more framing members together.

Referring now to FIGS. 7–10, a second preferred embodiment of a harpoon nail 22' in accordance with the present invention is shown. Nail 22' is similar to nail 22 previously discussed. Therefore, features and components of nail 22' that are the same as those in nail 22 will not be discussed.

Nail 22' has first and second finger members 36' and 38' that are substantially coplanar from tip 28' to head 30'. First and second sets of teeth 40' and 42' are located on outer side walls 50' of respective first and second finger members 36' and 38'. The first and second sets of teeth 40' and 42' extend along a portion of outer side walls 50' of respective first and second finger members 36' and 38'.

Figure 7:
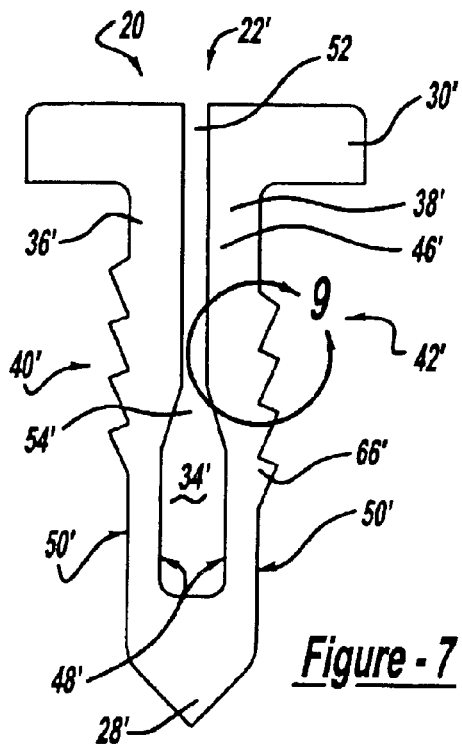
FIGS. 7 and 8 are respective front and side plan views of a second preferred embodiment of the harpoon nail in accordance with the present invention.
Figure 9:
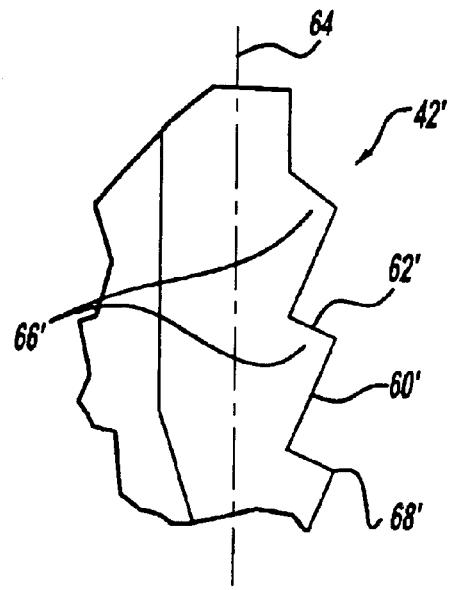
FIG. 9 is a fragmentary front plan view of the harpoon nail of FIG. 7 illustrating the teeth formed along the stem section in accordance with the present invention.
Figure 8:
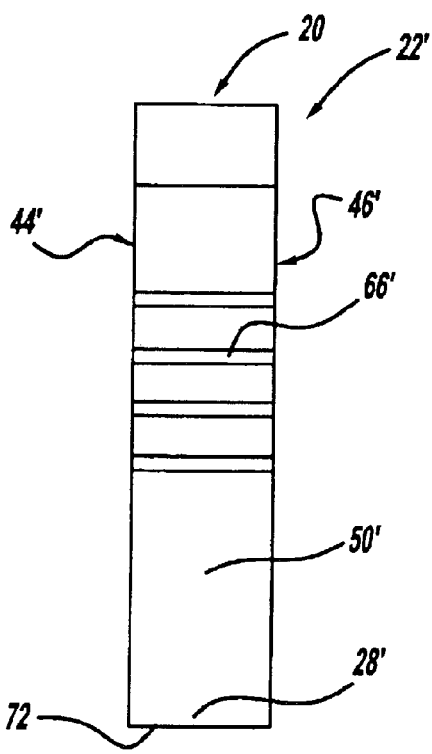
Figure 10:
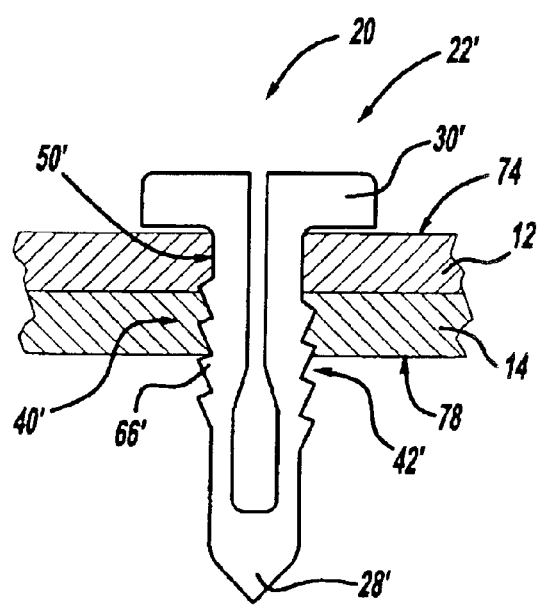
FIG. 10 is a cross-sectional view, taken along line 6—6 of FIG. 1, illustrating the second preferred embodiment of the harpoon nail driven through two steel members in accordance with the present invention.

As can be seen in FIG. 7, each tooth 66' on first set of teeth 40' are offset or staggered from each tooth 66' on second set of teeth 42'. That is, each tooth 66' of first and second sets of teeth 40' and 42' is located at a unique axial distance relative to head 30'. The staggering of teeth 66' of first and second sets of teeth 40' and 42' enables nail 22 to securely fasten framing members of various thicknesses between head 30' and one of the teeth 66' of the first or second sets of teeth 40' and 42' with a minimal pull-out distance or "play." Preferably, each tooth 66' is staggered to accommodate fastening together of framing members 12 and 14 of various standardized thicknesses.

In use, nail 22' is positioned with tip 28' adjacent two or more adjacent framing members and a driving force is applied to head 30'. The driving force causes tip 28' to penetrate through framing members 12 and 14. As stem 32' passes through framing members 12 and 14, the resistance of inner surfaces 76 of framing members 12 and 14 to be spread apart by nail 22' pushes first and second finger members 36' and 38' toward one another and narrows slot 34'. When head 30' is in contact with outer surface 74 of framing member 12, the shape and configuration of head 30 prevents nail 22 from penetrating further through framing members 12 and 14. The driving force is then removed and first and second finger members 36' and 38' attempt to return to their original state and teeth 66' on first and/or second sets of teeth 40' and 42' engage outer surface 78 of framing member 14. The engagement of first and/or second sets of teeth 40' and 42' with framing member 14 inhibits removal of nail 22' and fastens framing members 12 and 14 together between head 30' and first and/or second sets of teeth 40' and 42'.

Figure 11:
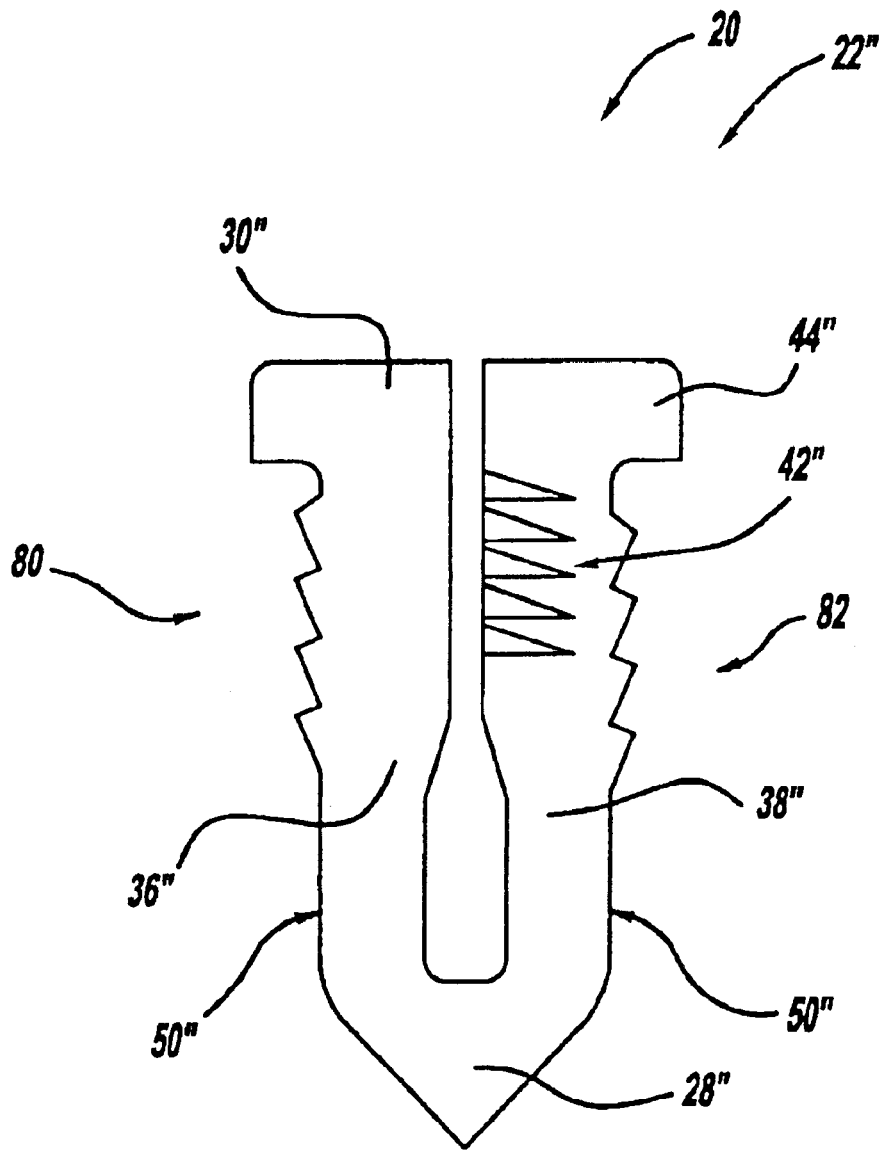
FIG. 11 is a front plan view of a third preferred embodiment of the harpoon nail in accordance with the present invention.
Figure 17:
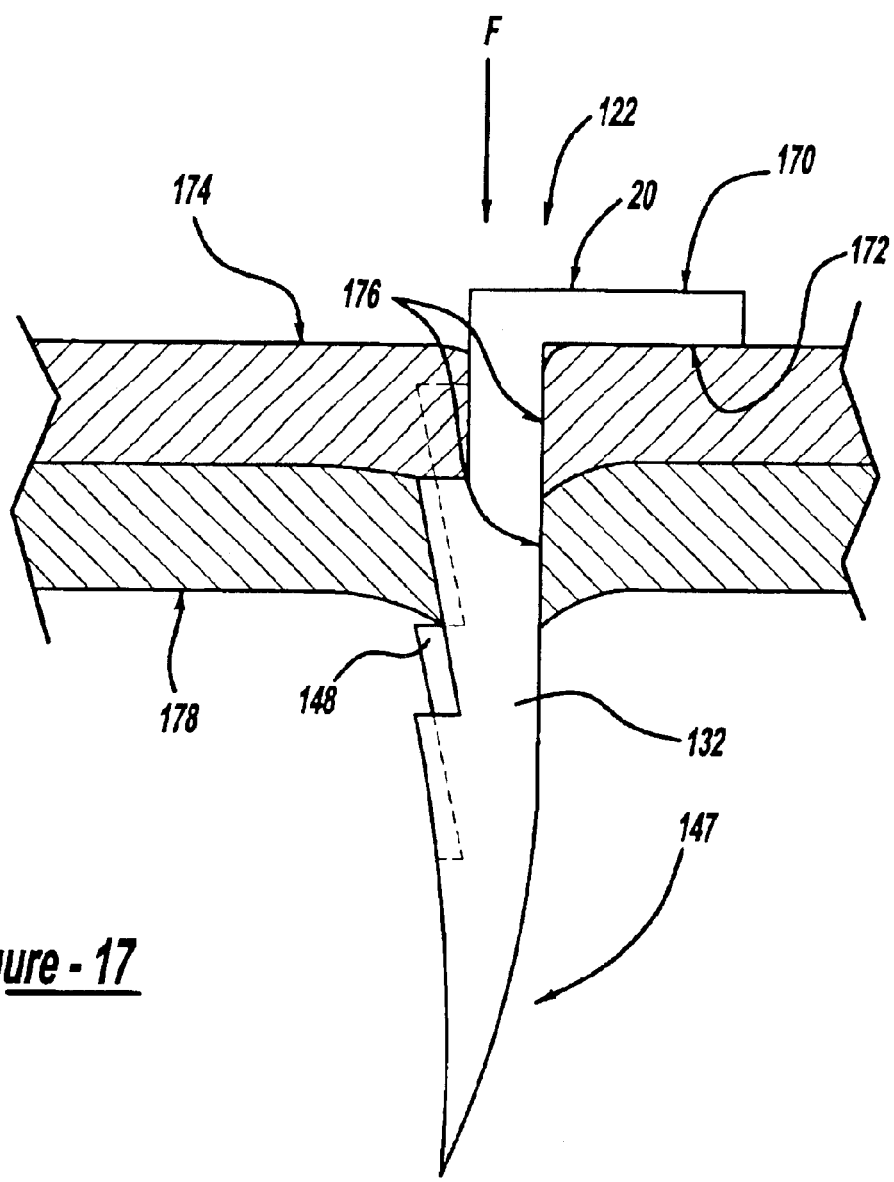
FIG. 17 is a cross-sectional view, taken along lines 17—17 of FIG. 12, illustrating the piercing nail driven through two steel framing members in accordance with the present invention.
Figure 18:
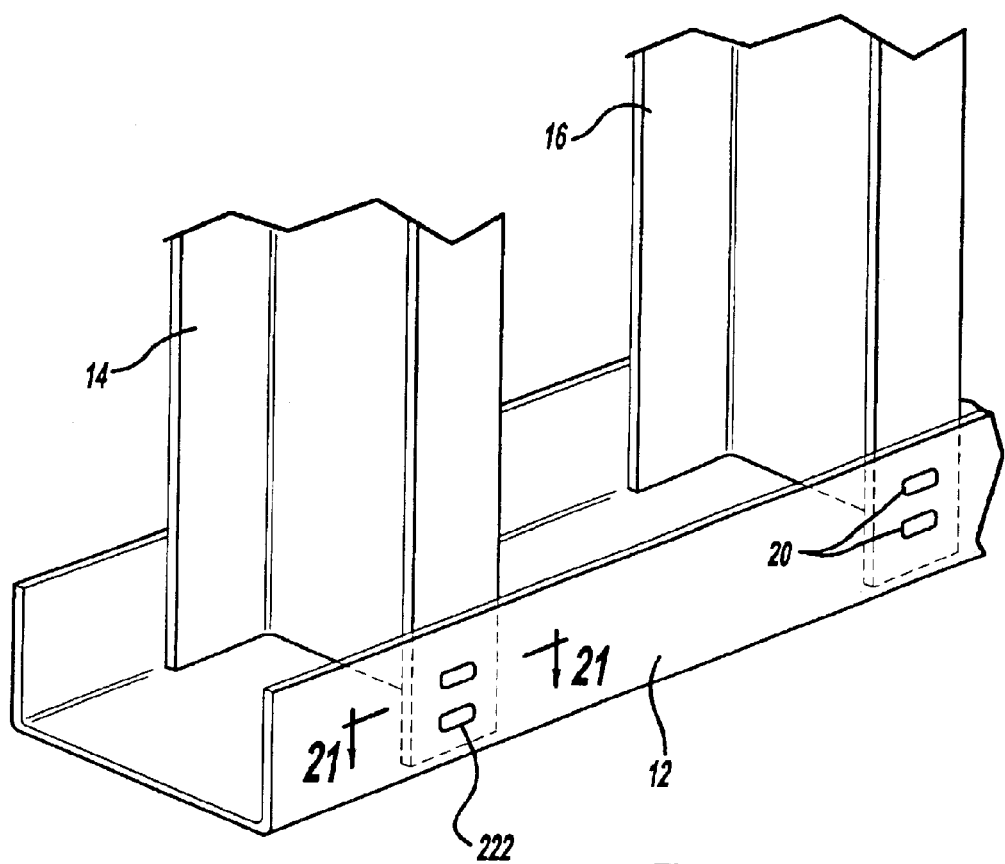
FIG. 18 is a fragmentary perspective view of a steel framing member having two additional steel framing members fastened thereto by a piercing nail with a spring member in accordance with the present invention.

Referring now to FIG. 11, a third preferred embodiment of harpoon nail 22" in accordance with the present invention is shown. Nail 22" is substantially similar to nails 22 and 22'. Therefore, similar features and components will not be discussed.

Nail 22" is essentially nail 22 with the addition of teeth along outer side walls 50" of first and second finger members 36" and 38". Specifically, a third set of teeth 80 are located along a portion of outer side wall 50" of first finger member 36" and a fourth set of teeth 82 are located along a portion of outer side wall 50" of second finger member 38". Third and fourth sets of teeth 80 and 82 are identical to first and second sets of teeth 40' and 42' of nail 22' shown in FIGS. 7–10.

In operation, nail 22" is positioned with tip 28" adjacent two or more adjacent framing members 12 and 14. A driving force is applied to head 30" to force nail 22" to penetrate through framing members 12 and 14. Finger members 36" and 38" are twisted relative to one another to be generally coplanar while nail 22" is being inserted through framing members 12 and 14. When head 30" is in contact with outer surface 74 of framing member 12, the driving force is removed and first and second finger members 36" and 38" are allowed to attempt to return to their original offset state. The attempt of first and second finger members 36" and 38" to return to their offset state causes first and/or second sets of teeth 40" and 42" to engage outer surface 78 of framing member 14. Concurrently, third and/or fourth sets of teeth 80 and 82 also engage outer surface 78 of framing member 14. Engagement of first and/or second and third and/or fourth sets of teeth 40", 42", 80 and 82 inhibit removal of nail 22" from framing members 12 and 14 and secures framing members 12 and 14 between head 30" and sets of teeth 40", 42", 80 and 82.

Figure 39:
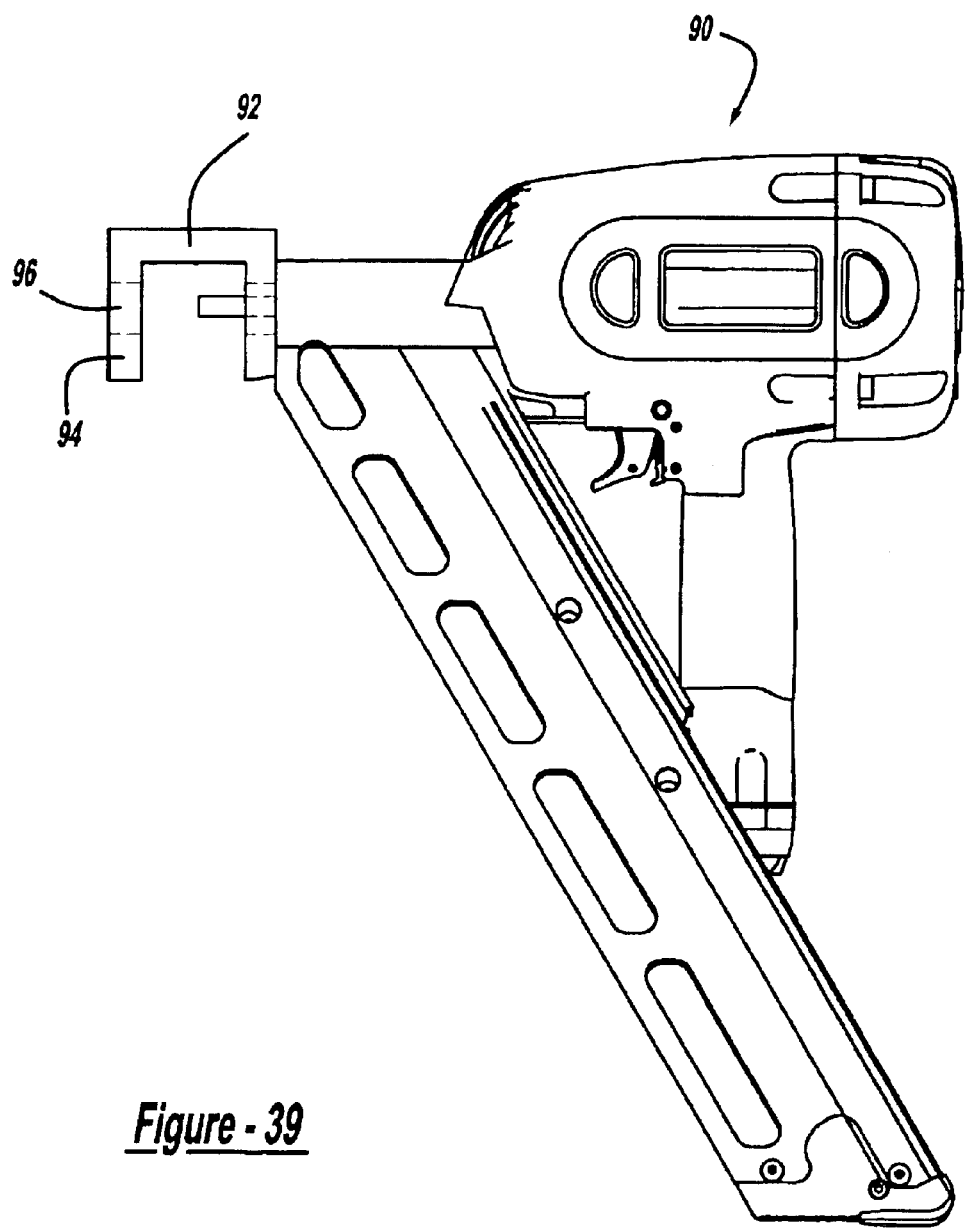
FIG. 39 illustrates a driving force applying device with an integral backing plate that can be used to provide an driving force to the nails in accordance with the present invention.

When nails 22, 22' and 22" are driven with an air nailer or ram-type device, such air nailer 90, shown in FIG. 39, depending upon the speed at which the device can drive nails 22, 22' and 22", a support for bottom surface 78 of framing member 14 may be needed. Preferably, the force transmitting device used is a rapid force transmitting device that can drive nails 22, 22' and 22" in excess of about 45 feet per second. When nails 22, 22' and 22" is driven in excess of about 45 feet per second, bottom surface 78 will not need to be supported. However, if the force transmitting device used drives nails 22, 22' and 22" at or below about 40 feet per second, bottom surface 78 may require support. To provide support, air nailer 90 is provided with a C-shaped frame 92 that has a back plate 94 that can be positioned in contact with bottom surface 78 of framing member 14 to prevent and/or minimize movement of framing members 12 and 14 when nail 22, 22', 22" is inserted therethrough. Back plate 94 has an opening 96 that allows nail 22, 22', 22" to pass therethrough so that back plate 94 does not prevent nail 22, 22', 22" from penetrating through framing members 12 and 14. As will be apparent to one skilled in the art, other types of backing plates or means of supporting bottom surface 78 of framing member 14 can be utilized without departing from the scope of the present invention.

Nail 22, 22', 22" can be made from a variety of materials. Preferably, nail 22, 22', 22" is made from hardened steel. However, other materials, such as galvanized coated steel, titanium or other strong material having similar characteristics to hardened steel that enable nail 22, 22', 22" to operate as described to fasten framing members 12 and 14 together can be utilized without departing from the scope of the present invention.

In accordance with a second aspect of the present invention, fasteners 20 are self-piercing nails 122, as shown in FIGS. 12–17. Nail 122 has a first end 124 and a second end 126. First end 124 has a tip 128 and second end 126 has a head 130. A stem 132 extends axially between head 130 and tip 128.

Stem 132 is generally C-shaped in cross section with a concave interior surface 134 and an opposite convex exterior surface 136. Interior and exterior surfaces 134 and 136 are separated by first and second edges 137 and 138. A first set of teeth 140 extend along a portion of first edge 137. A second set of teeth 142 extend along a portion of second edge 138. First and second edges 137 and 138 and respective first and second sets of teeth 140 and 142 form first and second ears 144 and 146 on stem 132. First and second ears 144 and 146 are resilient and can be bent or deformed toward one another during insertion of nail 122 through framing members 12 and 14 and will have a tendency to return to their normal (unbent or undeformed) state upon passing through framing members 12 and 14, as will be discussed in more detail below. Stem 132 reduces in cross-section to a point as it extends toward tip 128. As can best be seen in FIG. 16, a lower portion 147 of exterior surface 136 curves toward interior surface 134 as stem 132 extends from head 130 toward tip 128. This curvature of exterior surface 136 facilitates insertion of nail 122 through framing members 12 and 14, as will be discussed in more detail below. First and second edges 137 and 138 can be generally parallel and/or coplanar, as shown in FIG. 16. Alternatively, first and second edges 137 and 138 can be angled relative to one another as shown in FIGS. 13 and 14. While stem 132 is shown as being generally C-shaped in cross section, it should be understood that shapes that provide edges which can have sets of teeth can be utilized and still be within the scope of the invention. For example stem 132 can be V-shaped or U-shaped in cross section.

Each tooth 148 of first and second sets of teeth 140 and 142 has an axial section 160 and a radial section 162. A leading edge 168 of each tooth 148 is formed by an intersection of an axial section 160 with a radial section 162. Radial sections 162 of each tooth 148 are generally parallel to head 130. However, it should be understood that radial sections 162 do not need to be parallel to head 130 to be within the scope of the present invention.

As can best be seen in FIG. 16, first and second sets of teeth 140 and 142 are staggered so that a radial section 162 of each tooth 148 is a unique axial distance from head 130. Staggering of teeth 148 of first and second sets of teeth 140 and 142 essentially doubles the frequency at which a tooth 148 occurs along an axial length of nail 122. Staggering of first and second sets of teeth 140 and 142 enables nail 122 to fasten together framing members 12 and 14 of varying thicknesses with a minimal pull out distance or "play". In other words, the staggering of the teeth minimize a difference between a combined thickness of framing members 12 and 14 and a distance between head 130 and a tooth 148 that engages with a bottom surface 178 of framing member 14. The minimized distance minimizes the "play" or pull-out distance and thus provides more flexibility of nail 122 for use with framing members 12 and 14 of varying thicknesses.

Head 130 has opposite top and bottom surfaces 170 and 172 which are generally C-shaped to be complementary to the C-shaped cross section of stem 132. The bottom surface 172 of head 130 engages with a top surface 174 of framing member 12 to fasten framing members 12 and 14 together, as will be described in more detail below. Top surface 170 is adapted to receive a driving force to cause nail 122 to penetrate through framing members 12 and 14. Head 130 can be adapted to be driven by various types of driving tools, as is known in the art. For example, an air nailer or ram-type device, such as air nailer 90 shown in FIG. 38 can be used. Tip 128 has a point 173 that is configured to pierce framing members 12 and 14 upon application of a driving force.

As can be seen in FIG. 14, nail 122 is configured to be nested with a plurality of nails 122. The nesting capability of nail 122 allows a plurality of nails 122 to be nested together and fed into various types of driving tools which increase speed and efficiency of fastening framing members 12 and 14 together with nail 122.

In operation, tip 128 is positioned adjacent two or more adjacent framing members, such as framing members 12 and 14. A driving force F is applied to first end 124 or head 130. Axial force F causes tip 128 to pierce framing members 12 and 14 and nail 122 to penetrate through framing members 12 and 14. Nail 122 passes through framing members 12 and 14 until bottom surface 172 of head 130 contacts outer surface 174 of framing member 12. At least one tooth 148 passes completely through framing members 12 and 14. The at least one tooth 148 engages a bottom surface 178 of framing member 14. As nail 122 penetrates and passes through framing members 12 and 14, first and second ears 144 and 146 will be flexed toward one another due to interaction with inner surfaces 176. When first and second ears 144 and 146 or portions thereof have passed through framing members 12 and 14, they resiliently flex back to their original state thereby facilitating an engagement between nail 122 and inner surfaces 176. The springing outward of first and second ears 144 and 146 also facilitates engagement of the at least one tooth 148 with the bottom surface 176 of framing member 14. Engagement of the at least one tooth 148 with bottom surface 178 inhibits removal of nail 122 from framing members 12 and 14. Nail 122 thereby holds framing members 12 and 14 between head 130 and the at least one tooth 148 thereby fastening framing members 12 and 14 together. The curvature of lower portion 147 of exterior surface 136 facilitates insertion of nail 122 through framing members 12 and 14. Additionally, the C-shaped cross section of stem 132 also facilitates insertion of nail 122 through framing members 12 and 14 while allowing a portion of framing members 12 and 14 to resiliently spring into a portion of the interior of stem 132 to help facilitate engagement of bottom surface 178 of framing member 14 with tooth 148. Piercing nail 122 thereby provides the required pull out force and sheer force as was stated above.

When air nailer 90 and/or a ram-type device is used to fasten framing member 12 and 14 together with nail 122, depending upon the speed at which the device can drive nail 122, a support for bottom surface 78 of framing member 14 may be needed. Preferably, the force transmitting device used is a rapid force transmitting device that can drive nail 122 in excess of about 45 feet per second. When nail 122 is driven in excess of about 45 feet per second, bottom surface 78 will not need to be supported. However, if the force transmitting device used drives nail 122 at or below about 40 feet per second, bottom surface 78 may require support. To provide support, bottom surface 78, nailer 90 can have a C-shaped frame 92 with back plate 94. Opening 96 in back plate 94 allows nail 122 to penetrate through framing members 12 and 14 without interference from back plate 94. However, it should be understood that other means or methods of supporting bottom surface 178 of framing member 14 during the insertion of nail 122 can be employed without being departing from the scope of the present invention.

Nail 122 can be made from a variety of materials. Preferably, nail 122 is made from hardened steel. However, other materials, such as galvanized coated steel, titanium or other strong material having similar characteristics to hardened steel that enable nail 122 to operate as described to fasten framing members 12 and 14 together can be utilized without departing from the scope of the present invention.

Figure 19:
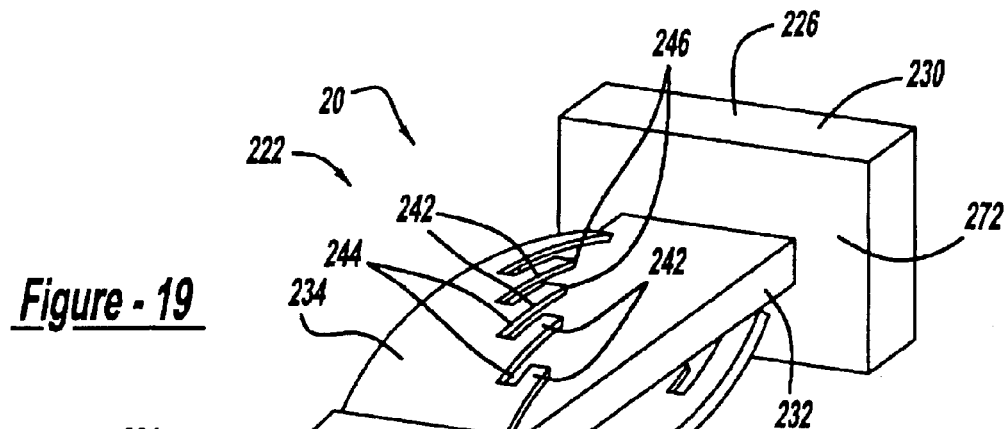
FIG. 19 is a perspective view of a first preferred embodiment of a piercing nail with a spring member in accordance with the present invention.
Figure 20A:
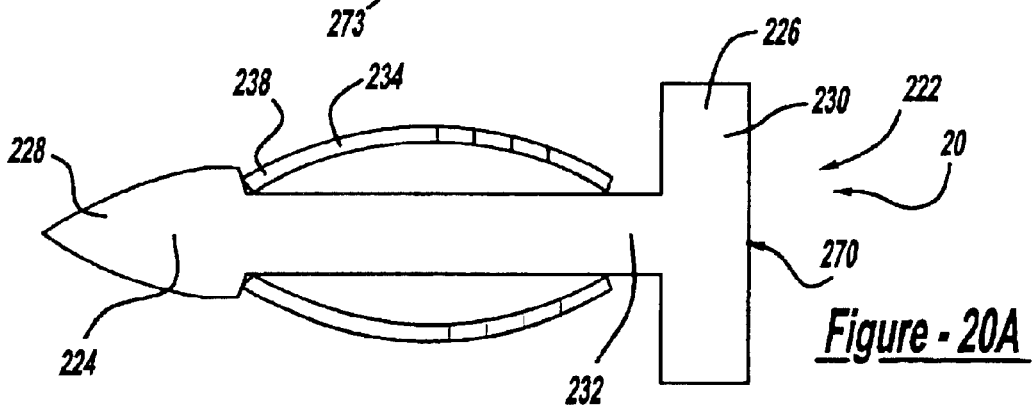
FIGS. 20A and 20B are a side view and a top view of piercing nail of FIG. 19.
Figure 20B:
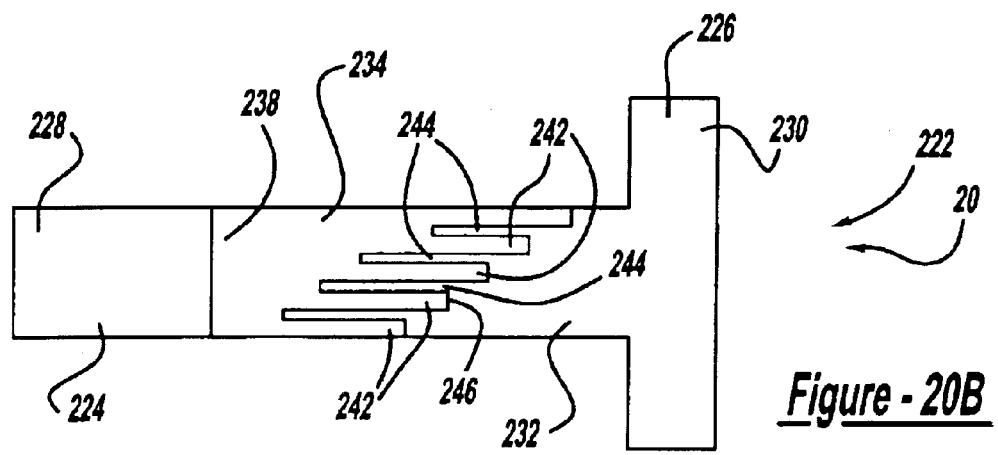

In accordance with a third aspect of the present invention, fasteners 20 are self-piercing nails with a spring member 222, as shown in FIGS. 18–29. In a first preferred embodiment, as shown in FIGS. 19–21, nail 222 has opposite first and second ends 224 and 226. First end 224 has a tip 228 that is configured to pierce and penetrate through framing members 12 and 14. Second end 226 has a head 230 that is configured to receive a driving force F to drive nail 222 through framing members 12 and 14. A stem 232 extends axially between head 230 and tip 228. Two or more spring members 234 extend axially along a portion of stem 232 between tip 228 and head 230.

Each spring member 234 has a plurality of engaging surfaces 236 that are configured to engage with framing members 12 and 14 to inhibit removal of nail 222 and fasten framing members 12 and 14 together, as will be described in more detail below. A first end 238 of spring member 234 is attached to stem 232 adjacent tip 228 by various well known means. A second end 240 of spring member 234 can be attached to stem 232 proximate head 230, as shown in FIGS. 19–21, or, alternatively, can be a free end. Spring members 234 are made from an elastic or resilient material that allows spring members 234 to be compressed as nail 222 passes through framing members 12 and 14 and expand towards their original shape after passing through the framing members, as will be described in more detail below. For example, spring members 234 can be made from a metal, such as steel, or made from plastic. Spring members 234 are bowed outwardly from stem 232 to facilitate being compressed when passing through framing members 12 and 14.

Referring now to FIGS. 19–21, each spring member 234 has a plurality of engaging surfaces 236 in the form of fingers 242. Each finger 242 is separated by a slot 244 that allow each finger 242 to flex individually. Each finger 244 has a free end 246 that can be used to engage with framing members 12 and 14 to inhibit removal of nail 222 from framing members 12 and 14 and also to fasten framing members 12 and 14 between head 230 and a free end 246, as will be described in more detail below. Each finger 242 extends axially along spring member 234 from first end 238 a varying length. The varying lengths of fingers 242 on spring member 234 allows nail 222 to accommodate framing members 12 and 14 of varying thicknesses. As can be seen in FIG. 19, there are two spring members 234 on opposite sides of stem 232. The fingers 242 on each spring member 234 are arranged so that the shortest finger are along different edges of stem 232. Additionally, fingers 242 on one side of nail 22 are staggered relative to fingers 242 on an opposite side of nail 222 so that no two fingers 242 extend axially from the first end 238 the same distance. The staggering of the fingers 242 on the opposite sides of nail 222 also facilitate the fastening of framing members 12 and 14 of varying thicknesses.

Head 230 is configured to prevent nail 222 from passing entirely through framing members 12 and 14. Specifically, head 230 has a bottom surface 272 that engages with top surface 274 of framing member 12 to prevent the entire nail 222 from passing through framing members 12 and 14 during the fastening process. Head 230 has a top surface 270 that is configured to receive driving force F to cause nail 222 to penetrate through framing members 12 and 14. Head 230 and nail 222 can be adapted to be driven by various types of driving tools as is known in the art. For example, an air nailer or ram-type device, such as air nailer 90 shown in FIG. 38 can be used in conjunction with nail 222 to fasten framing members together. Tip 228 has a leading edge 273 that is configured to pierce framing members 12 and 14 upon application of driving force F.

Figure 21A:
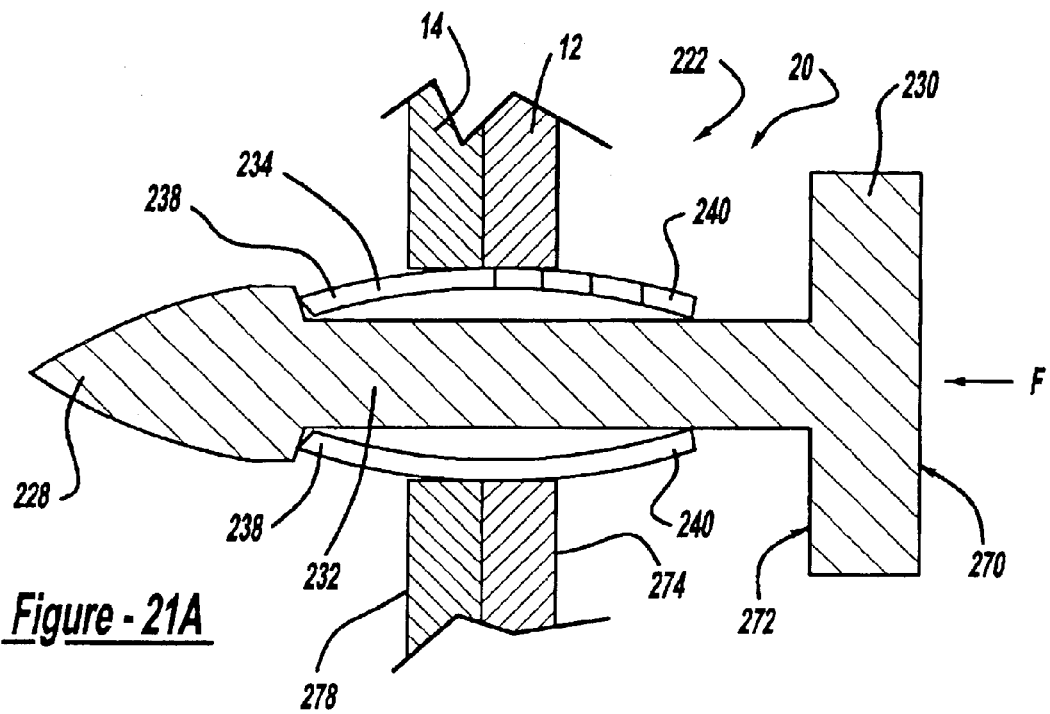
FIG. 21A is a cross-sectional view, taken along line 21—21 of FIG. 18, illustrating the first preferred embodiment of the piercing nail with a spring member partially piercing through two steel framing members.
Figure 21B:
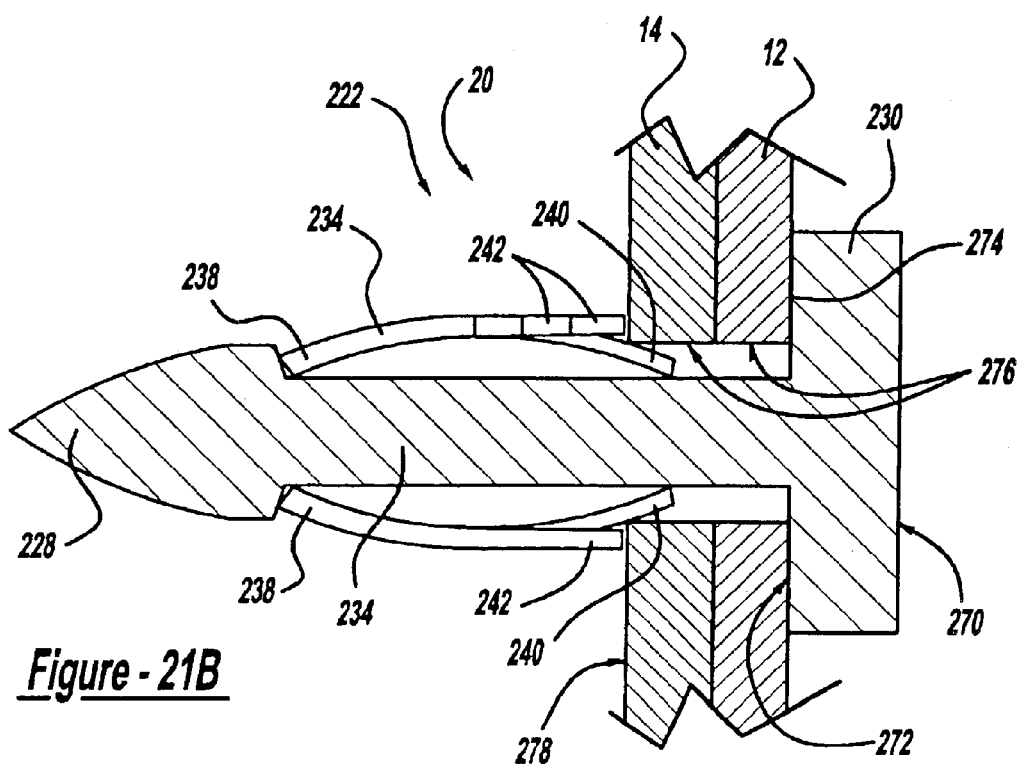
FIG. 21B is a cross-sectional view, taken along line 21—21 of FIG. 18, illustrating spring fingers of the first preferred embodiment of the piercing nail with spring member engaging the underside of one of the steel framing members.
Figure 22:
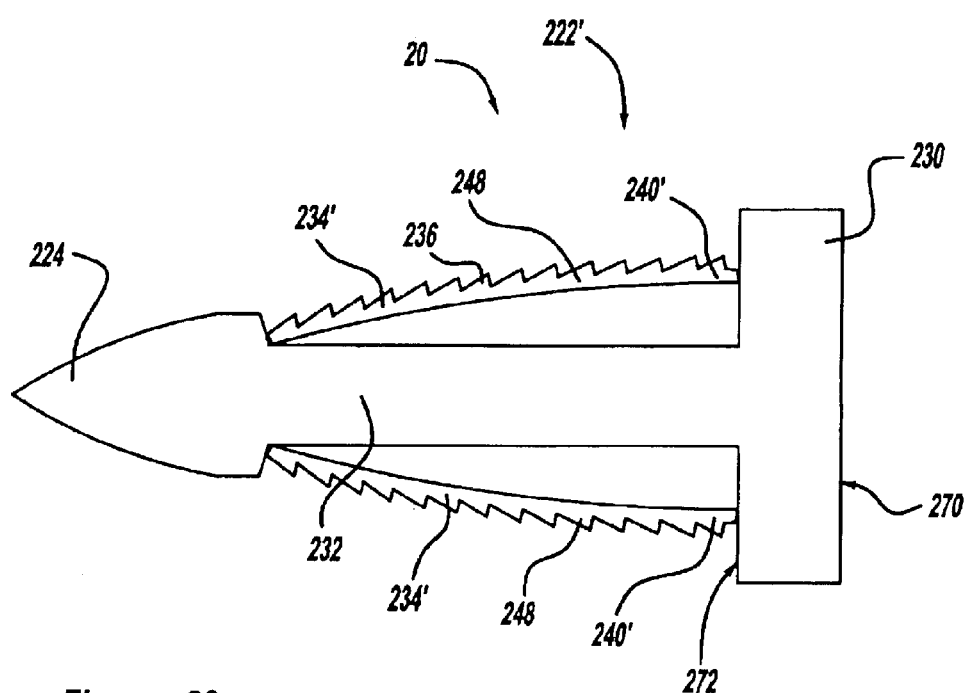
FIG. 22 is a side view of a second preferred embodiment of a piercing nail with spring member in accordance with the present invention.
Figure 23A:
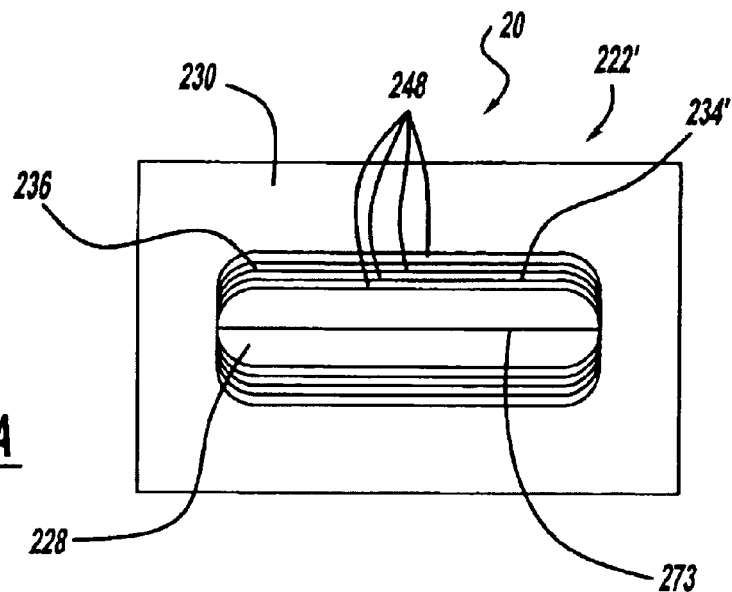
FIG. 23A is a bottom view of the second preferred embodiment of the piercing nail with spring member in accordance with the present invention.

In operation, as can be seen in FIGS. 21A and 21B, nail 222 is positioned with tip 228 adjacent top surface 274 of framing member 12. Axial force F is applied to head 230 which causes tip 228 to pierce and stem 232 to penetrate through framing members 12 and 14. As stem 232 of nail 222 passes through framing members 12 and 14, inner surfaces 276 of framing members 12 and 14 compress spring members 234 towards stem 232. As individual fingers 242 clear inner surfaces 276 of framing member 14, the fingers 242 expand outwardly away from stem 232 back to their original state. Axial force F is continued to be applied to nail 222 until bottom surface 272 of head 230 contacts top surface 274. As shown, a last finger 242 to pass through framing member 14, will engage with bottom surface 278 of framing member 14 and inhibit removal of nail 222. Engagement of finger 242 with bottom surface 278 fastens framing members 12 and 14 between finger 242 and head 230. As shown in FIG. 21B, the entire spring member 234 does not need to pass all the way through framing members 12 and 14 for nail 222 to fasten framing members 12 and 14 together due to the varying length of the individual fingers 242 and the staggering of fingers 242 on opposite sides of stem 232. Thus, nail 222 can be used to fasten framing members 12 and 14 together of varying thicknesses.

Referring now to FIGS. 22–25, a second preferred embodiment of piercing nail 222' is shown. In this embodiment, second end 240' of spring members 234' are free to move relative to stem 232. Engaging surfaces 236' on spring members 234' are in the form of a plurality of teeth 248. Teeth 248 are spaced axially along spring members 234' so that teeth occur at regular intervals. As shown, teeth 248 on spring members 234' on opposite sides of stem 232 are aligned. However, it should be understood that the individual teeth 240 on each spring member 236' can be staggered so that no two teeth 248 are located a same axial distance from first end 238 of spring member 234'. Referring now to FIGS. 23A–C, it can be seen that nail 222' can have spring members 234' along two sides of stem 232, as shown in FIG. 23A, four spring members 234' located along four surfaces of stem 232, as shown in FIG. 23B, or can be concentric about stem 232 and extend around an entire periphery of stem 232. When nail 222' has spring members 234' that are concentric about stem 232, stem 232' is cylindrical.

Figure 24:
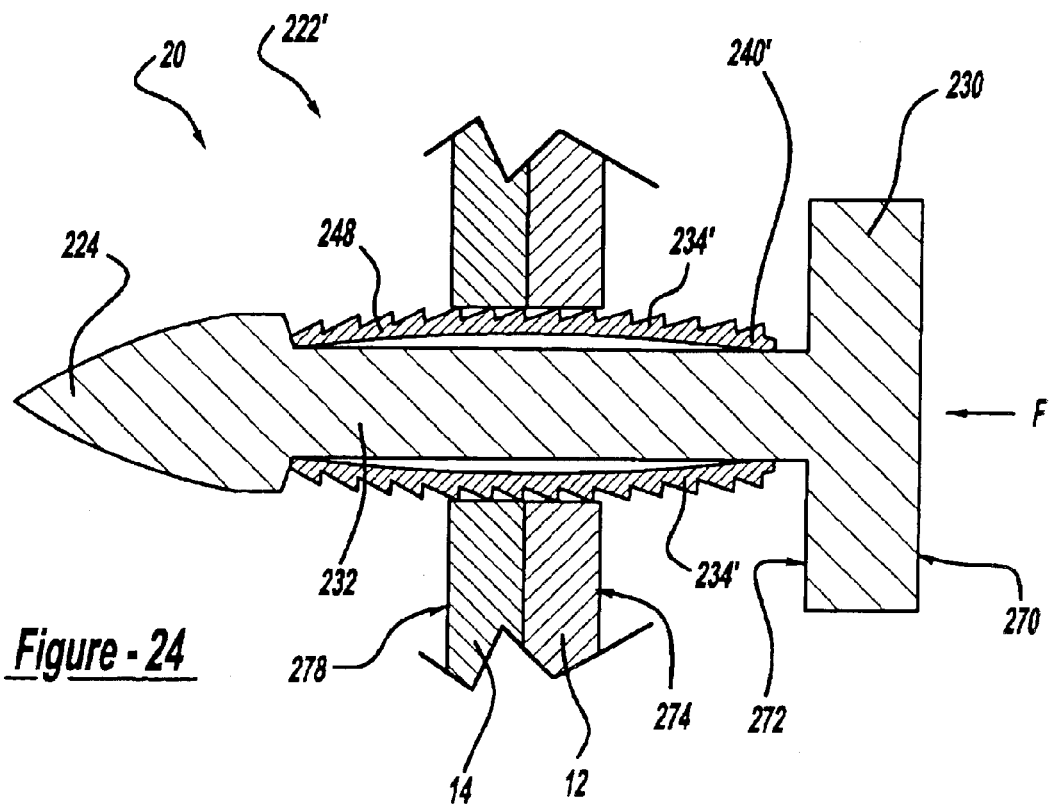
FIG. 24 is a cross-sectional view, taken along line 21—21 of FIG. 18, illustrating the second preferred embodiment of the piercing nail with spring member partially piercing through two steel framing members.
Figure 23B:
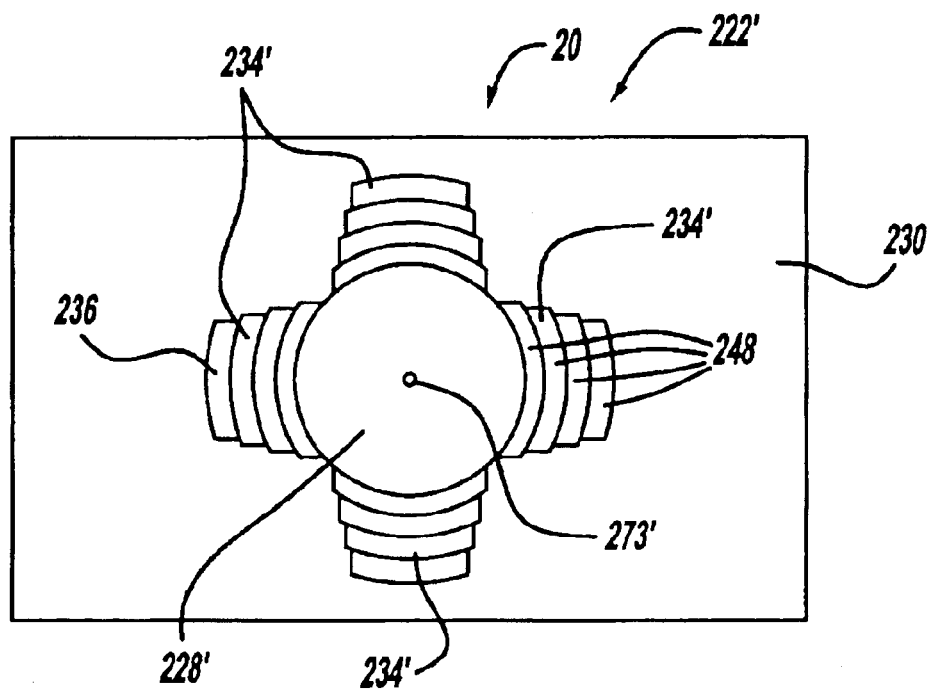
FIG. 23B is a bottom view of a variation of the second preferred embodiment of the piercing nail with spring member in accordance with the present invention.
Figure 23C:
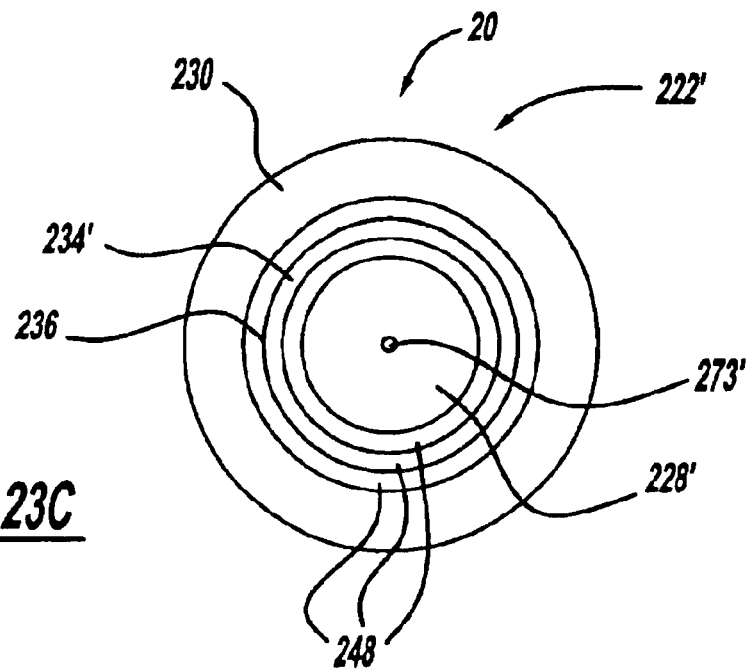
FIG. 23C is a bottom view of yet another variation of the second preferred embodiment of the piercing nail with spring member in accordance with the present invention.
Figure 25:
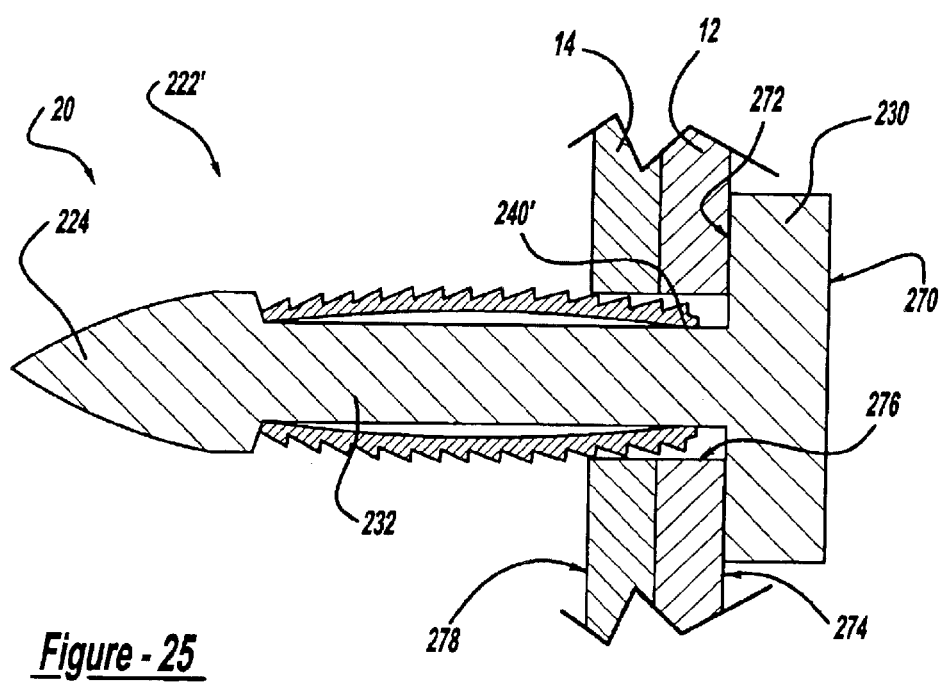
FIG. 25 is a cross-sectional view, taken along line 21—21 of FIG. 18, illustrating spring fingers of the second preferred embodiment of the piercing nail with spring member engaging the steel framing members.
Figure 26:
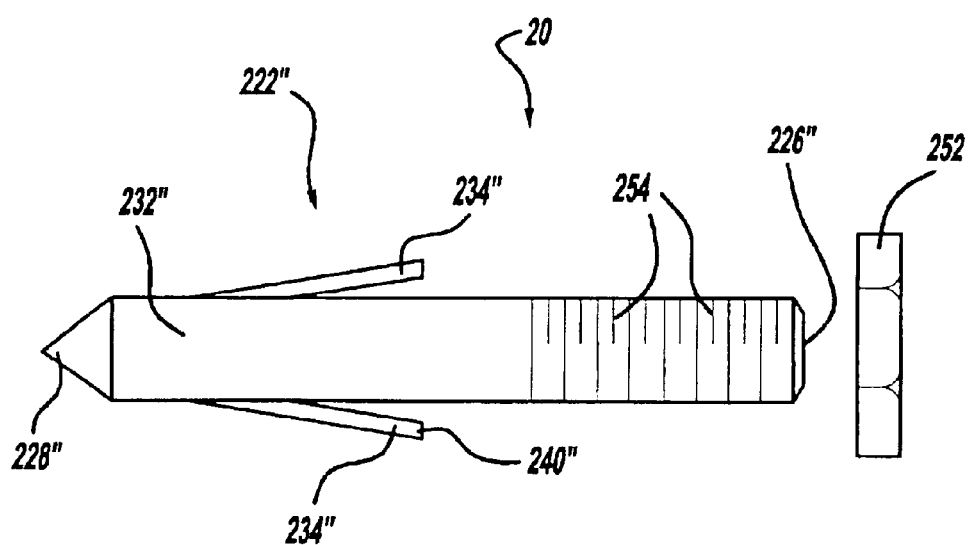
FIG. 26 is a side view of a third preferred embodiment of a piercing nail with spring member in accordance with the present invention.
Figure 27:
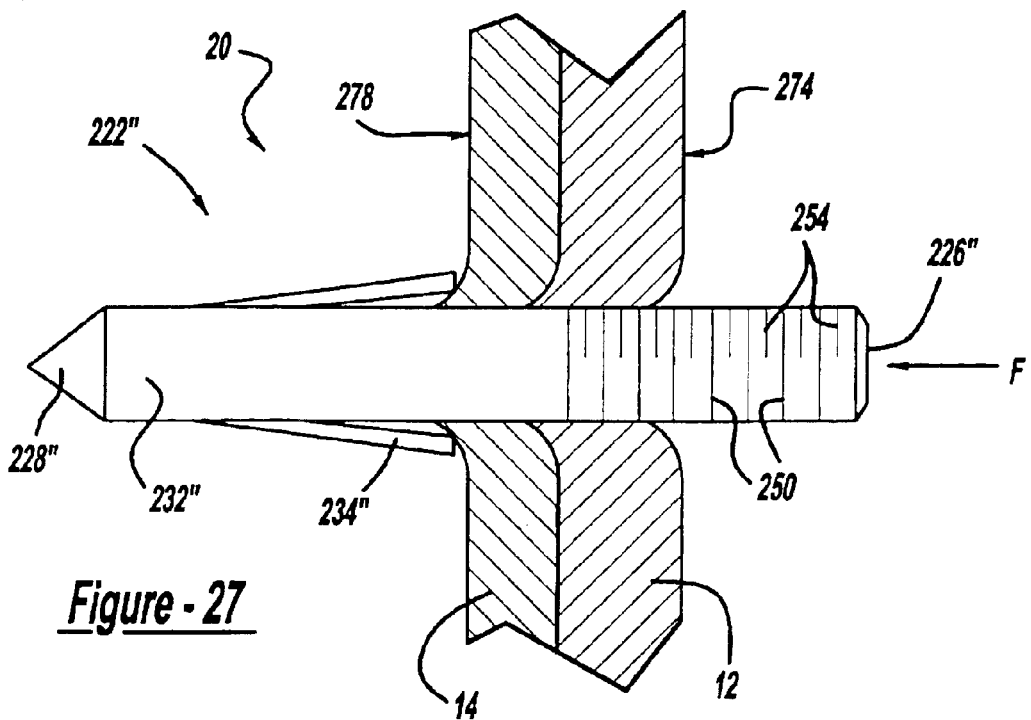
FIG. 27 is a cross-sectional view, taken along line 21—21 of FIG. 18, illustrating spring fingers of the third preferred embodiment of the piercing nail with spring member engaging the underside of one of the steel members in accordance with the present invention.
Figure 28:
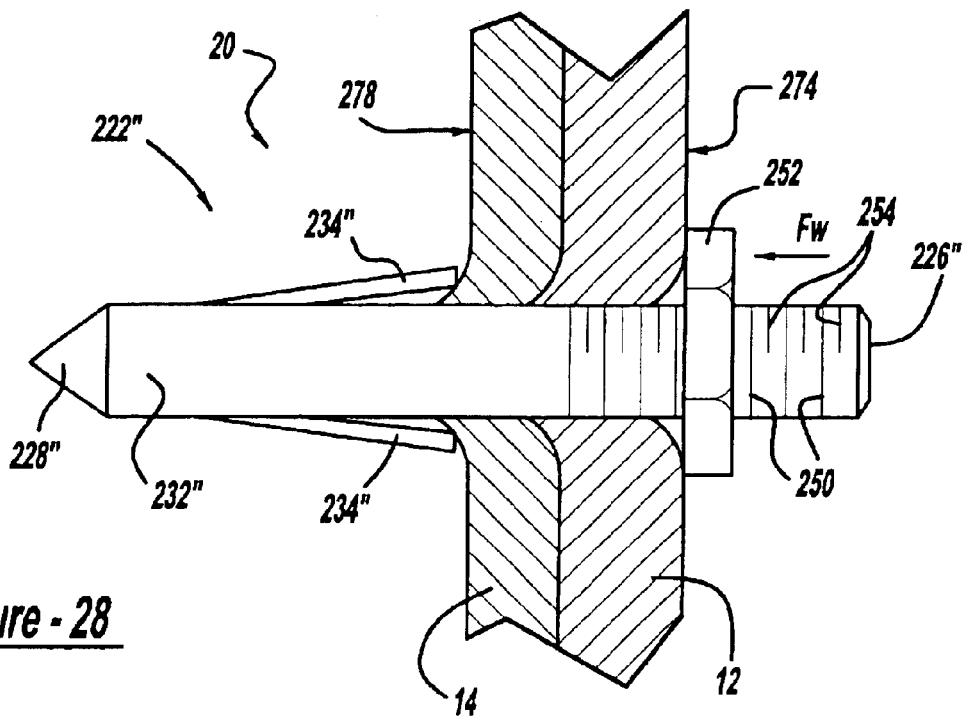
FIG. 28 is a cross-sectional view, taken along line 21—21 of FIG. 18, illustrating a press washer disposed on the shaft of the third preferred embodiment of the piercing nail with spring member in accordance with the present invention.

In operation, as shown in FIGS. 24 and 25, driving force F is applied to head 230 to cause tip 228 to pierce and penetrate through framing members 12 and 14. As stem 232 passes through framing members 12 and 14, inner surfaces 276 of framing members 12 and 14 compress spring members 234' toward stem 232. As portions of spring members 234' clear framing member 14, those portions try to expand away from stem 232 back to an original shape. As each tooth 248 clears bottom surface 278 of framing member 14, the tooth inhibits nail 222' from being removed from framing members 12 and 14. When bottom surface 272 of head 230 is in contact with top surface 274, driving force F is no longer applied and the last tooth and or teeth to clear bottom surface 278 of framing member 14 will engage bottom surface 278 and inhibit removal of nail 222' from framing members 12 and 14. Thus, nail 222' fastens framing members 12 and 14 together.

Referring now to FIGS. 26–29, a third preferred embodiment of nail 222" is shown. In this embodiment, second end 226" has a ribbed portion 250 that is configured to receive a press washer 252. Press washer 252 is configured to be pressed onto second end 226" and engage with ribbed portion 250. Ribbed portion 250 inhibits removal of press washer 252 from stem 232, as will be described in more detail below. Second ends 240" of spring members 234" are free to move relative to stem 232. In this embodiment, second ends 240" of spring members 234" are the engaging surfaces that will engage with bottom surface 278 of framing member 14 to fasten framing members 12 and 14 together, as will be described in more detail below. Stem 232 also has a plurality of fractures 254 spaced axially along a portion of stem 232 proximate second end 226". Fractures 254 facilitate a controlled breaking off of a portion of stem 232 proximate second end 226" so that stem 232 protrudes a minimal distance from top surface 274 of framing member 12 when fastening framing members 12 and 14 together, as will be described in more detail below.

Figure 29:
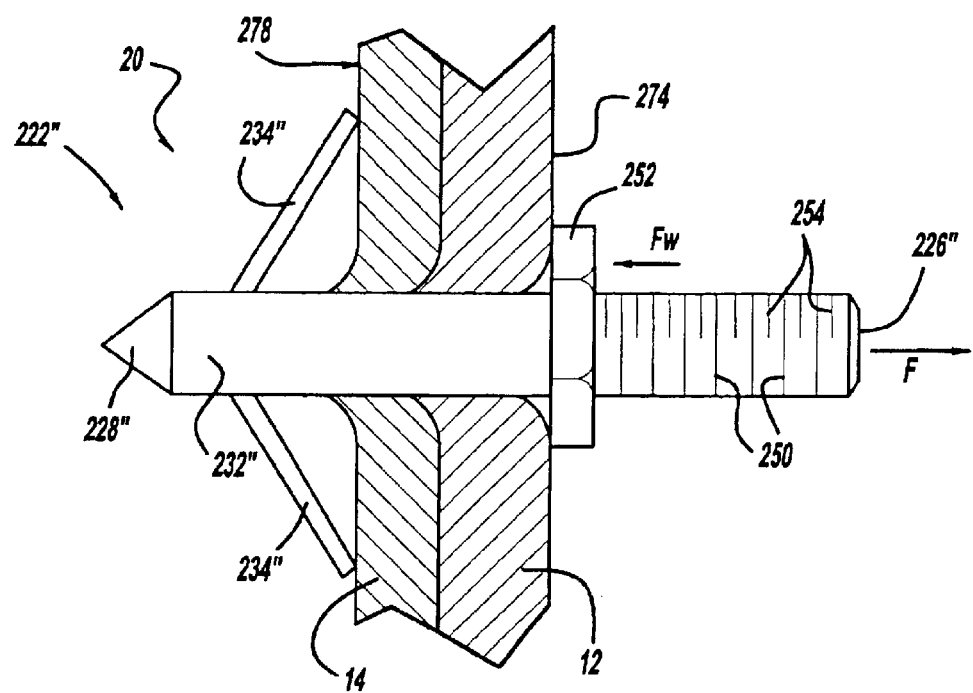
FIG. 29 is a cross-sectional view, taken along line 21—21 of FIG. 18, illustrating further expansion of the spring fingers of the third preferred embodiment of the piercing nail with spring member engaging the underside of one of the steel framing members in accordance with the present invention.
Figure 30:
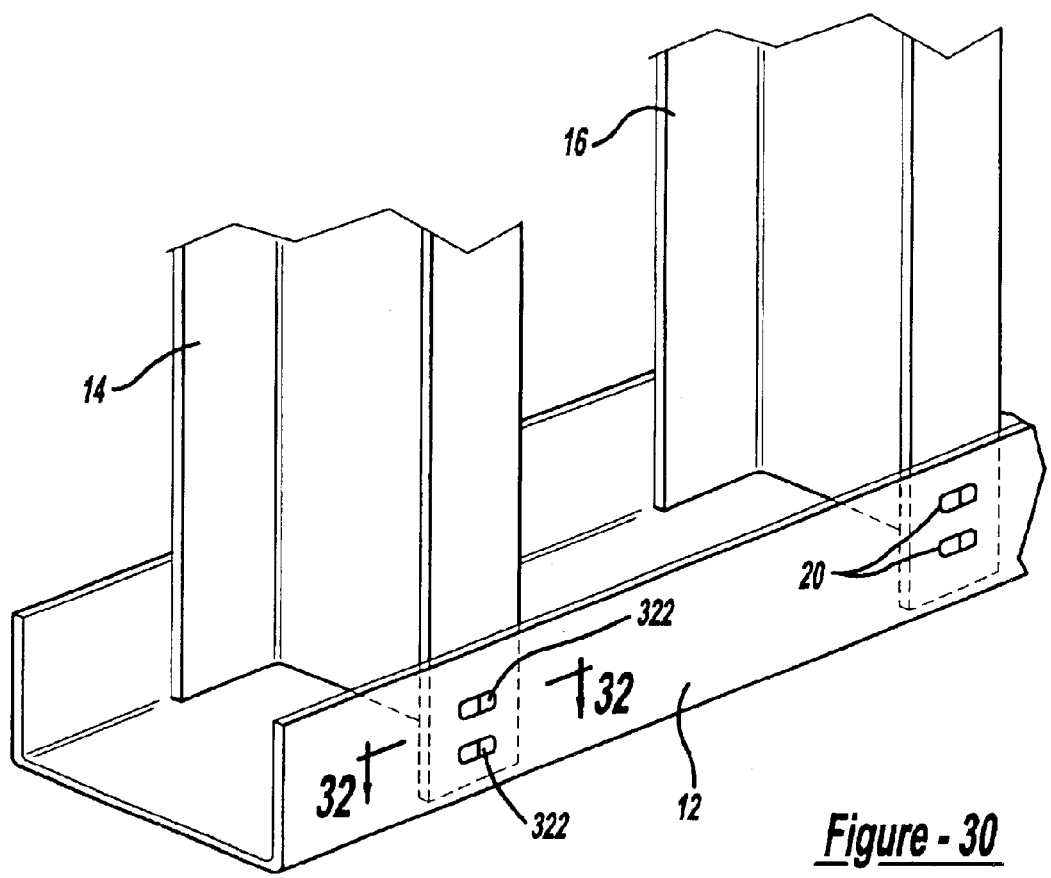
FIG. 30 is a fragmentary perspective view of a steel framing member having two additional steel framing members fastened thereto by a self-locking nail in accordance with the present invention.
Figure 31:
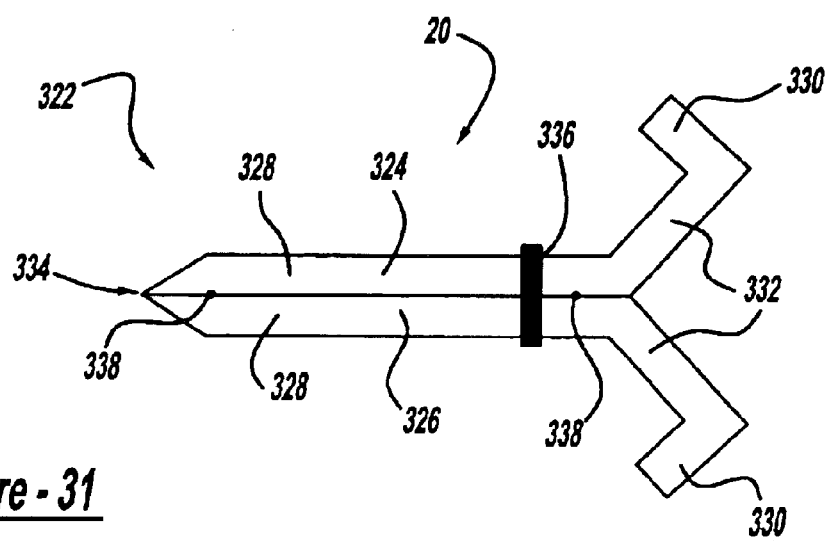
FIG. 31 is a side view of a first preferred embodiment of a self-locking nail in accordance with the present invention.

In use, driving force F is applied to second end 226" of piercing nail 222" to cause tip 228, spring members 234" and a portion of stem 232 to pass through framing members 12 and 14. Once second ends 240" of spring members 234" pass completely through framing member 14, driving force F is removed and press washer 252 is pressed along a portion of stem 232 with driving force Fw. A reverse driving force F is applied to press washer 252 and/or stem 232 to pull stem 232 away from framing members 12 and 14, as shown in FIG. 29. The pulling of stem 232 away from framing members 12 and 14 causes second ends 240" of spring members 234" to engage bottom surface 278 of framing member 14 and spread outwardly from stem 232. Once spring members 234" have been sufficiently spread apart, press washer 252 is moved along stem 232 until press washer 252 contacts top surface 274. A portion of stem 232 proximate second end 226" is then broken off along a fracture 254 so that the portion of stem 232 extending outwardly from press washer 252 is a minimal length. Steel framing members 12 and 14 are then securely fastened between spring members 234 and press washer 252.

When air nailer 90 and/or a ram-type device is used to fasten framing members 12 and 14 together with nail 222, 222', 222", depending upon the speed at which the device can drive nail 222, 222', 222", a support for bottom surface 78 of framing member 14 may be needed. Preferably, the force transmitting device used is a rapid force transmitting device that can drive nail 222, 222', 222" in excess of about 45 feet per second. When nail 222, 222', 222" is driven in excess of about 45 feet per second, bottom surface 78 will not need to be supported. However, if the force transmitting device used drives nail 222, 222', 222" at or below about 40 feet per second, bottom surface 78 may require support. To provide support, nailer 90 can be provided with C-shaped frame 92 with back plate 94 that supports bottom surface 278 of framing member 14. Opening 96 in back plate 94 allows nail 222, 222', 222" to penetrate through framing members 12 and 14 without interference from back plate 94. However, it should be understood that other means or methods of supporting bottom surface 278 of framing member 14 during the insertion of nail 222, 222', 222" can be employed without departing from the scope of the present invention.

Nail 222, 222', 222" can be made from a variety of materials. Preferably, nail 222, 222', 222" is made from hardened steel. However, other materials, such as galvanized coated steel, titanium or other strong material having similar characteristics to hardened steel that enable nail 222, 222', 222" to operate as described to fasten framing members 12 and 14 together can be utilized without departing from the scope of the present invention.

In accordance with a forth aspect of the present invention, fasteners 20 are self-locking nails 322, as shown in FIGS. 30–38. Nail 322 is comprised of first and second members 324 and 326 that each have an elongated portion 328, a flange portion 330, and an angular portion 332 that extends between elongated portion 328 and flange portion 330. Angular portions 332 extend from elongated portions 328 at an angle such that angular portions 332 are not parallel with elongated portions 328. Preferably, angular portions 332 extend from elongated portions 328 at an angle in the range of about 15 to 60 degrees. Flange portions 330 extend from angular portions 332 at an angle such that flange portions 330 are not parallel with angular portions 332. Preferably, flange portions 330 extend at a right angle to angular portions 332. While specific angles or ranges have been disclosed, it should be understood that other angles or different ranges can be utilized without departing from the scope of the present invention.

Elongated portions 328 of first and second members 324 and 326 are positioned adjacent one another and form a tip 334 that is configured to pierce framing members 12 and 14. Elongated portions 328 of first and second members 324 and 326 can be coupled together so that elongated portions 328 remain adjacent while passes through framing members 324 and 326, as will be described in more detail below. Elongated portions 328 can be coupled together in a variety of ways. For example, elongated portions 328 can be coupled together by a strap 336 and/or one or more spot welds 338. Strap 336 and spot welds 338 are configured to break and allow elongated portions 328 to separate from one another during the fastening process, as will be discussed in more detail below.

Nail 322 is configured to receive a driving force F to drive nail 322 through framing members 12 and 14. Specifically, driving force F can be applied to angular portions 332 and/or flange portions 330. As will be apparent to one skilled in the art, various types of well known devices can be utilized to apply driving force F to nail 322. For example, an air nailer or ram-type device, such as air nail 90 shown in FIG. 39, can be used to drive nails 322 through framing members 12 and 14. When using air nailer 90, depending upon the speed at which the device can drive nail 322, a support for bottom surface 78 of framing member 14 may be needed.

Preferably, the force transmitting device used is a rapid force transmitting device that can drive nail 322 in excess of about 45 feet per second. When nail 322 is driven in excess of about 45 feet per second, bottom surface 78 will not need to be supported. However, if the force transmitting device used drives nail 322 at or below about 40 feet per second, bottom surface 74 may require support. To provide support back plate 94 be positioned on a surface of the framing members opposite nail 322 to limit movement of and provide support for the framing members during the fastening process.

Elongated portions 328 are resilient or spring like such that elongated portions 328 can be flexed or bent relative to angular portions 332 and will exhibit a tendency to return to their normal (unflexed or unbent) state relative to angular portion 332. The resilient or spring like characteristics of elongated portions 328 enable elongated portions 328 to engage the framing members 12 and 14 after having passed therethrough to thereby fasten framing members 12 and 14 together, as will be described in more detail below. The junction of elongated portions 328 and angular portions 332 are semi-rigid so that as angular portions 332 pass through framing members 12 and 14, elongated portions 328 separate and strap 336 and/or spot welds 338 break and framing members 12 and 14 are fastened together by nail 322.

Figure 32:
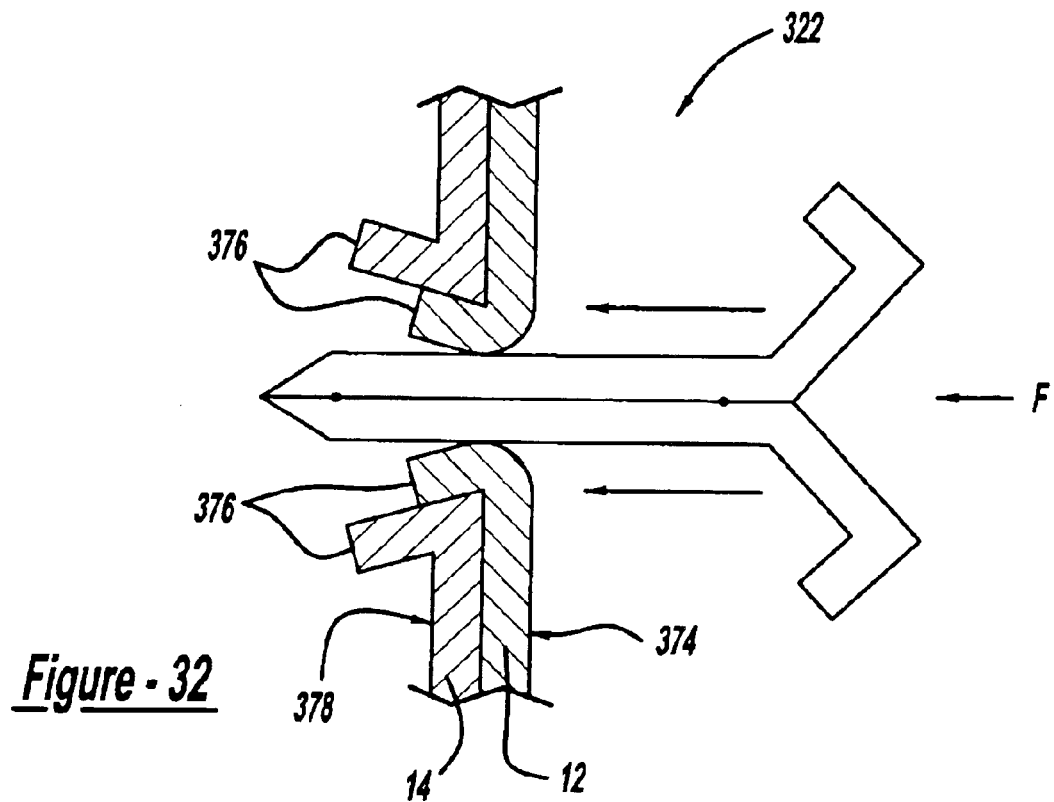
FIGS. 32 and 33 are cross-sectional views, taken along line 32—32 of FIG. 30, illustrating the self-locking nail of FIG. 31 partially piercing through two steel framing members.
Figure 33:
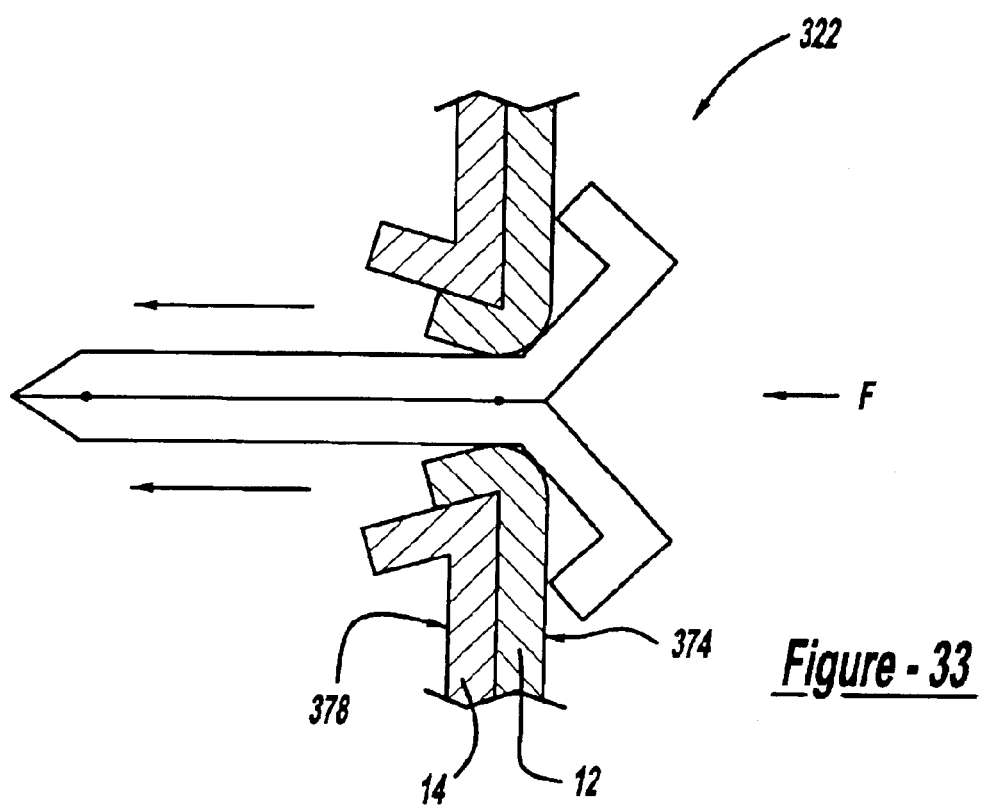
Figure 34:
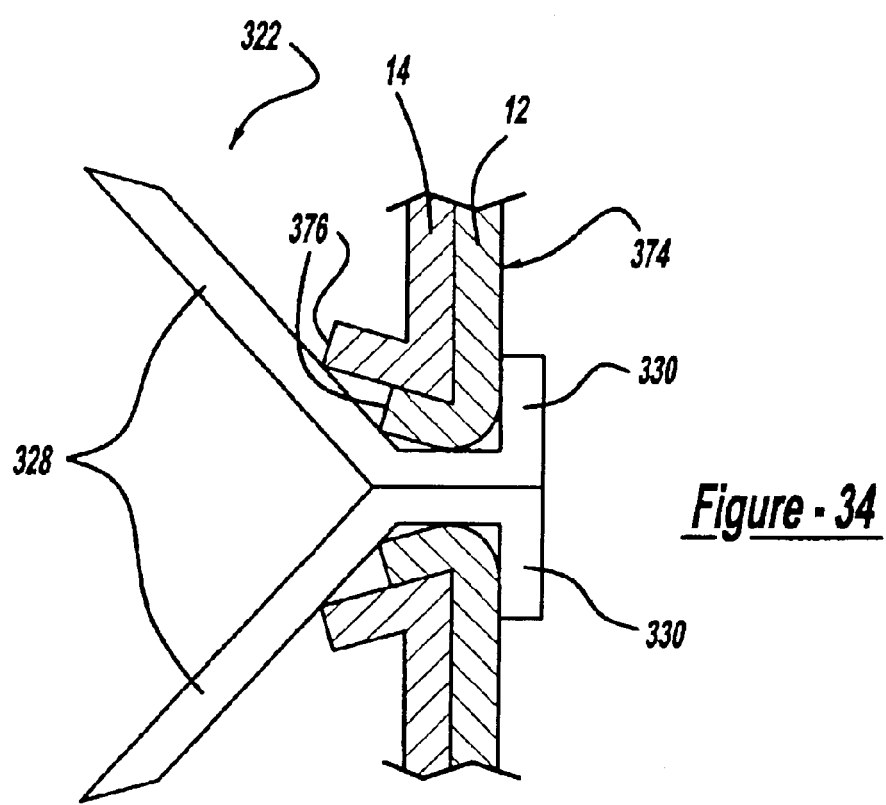
FIG. 34 is a cross-sectional view, taken along line 32—32 of FIG. 30, illustrating the flange portions of the self-locking nail of FIG. 31 partially driven against the outer surface of the framing members in accordance with the present invention.
Figure 35:
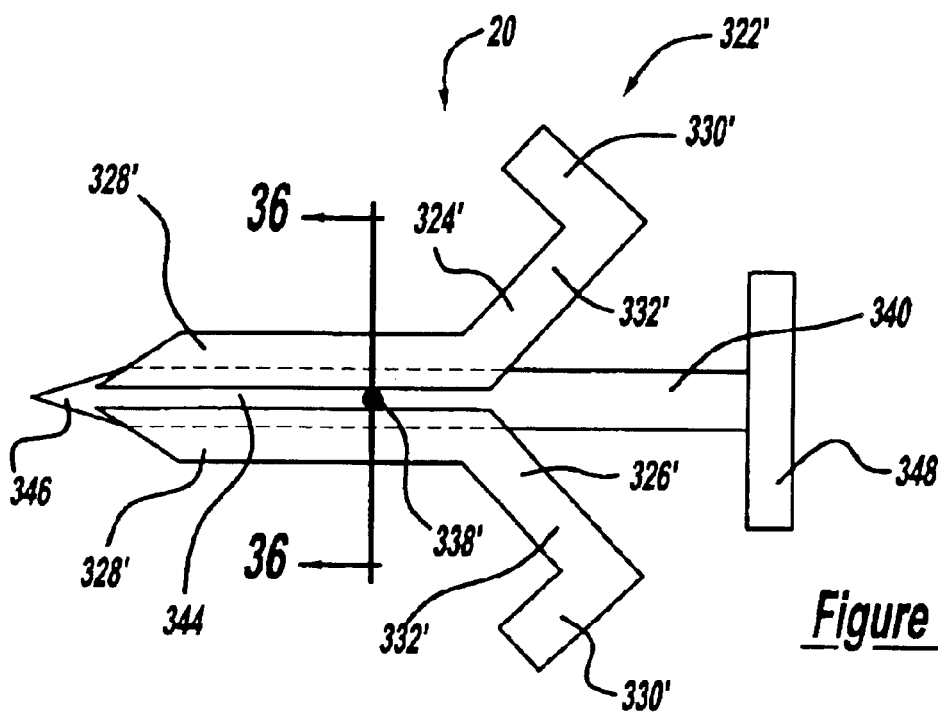
FIG. 35 is a side view of a second preferred embodiment of a self-locking nail in accordance with the present invention.
Figure 36:
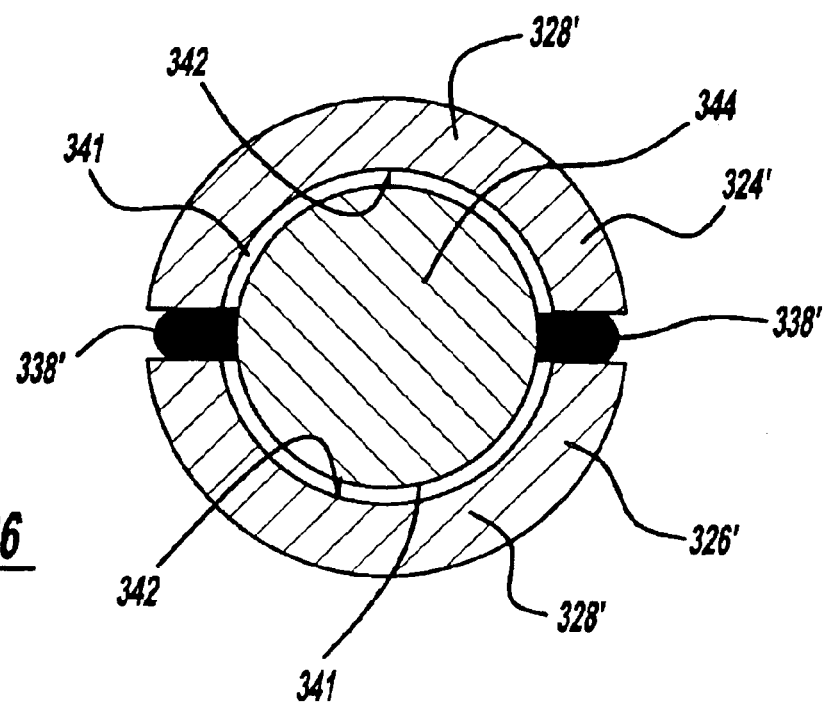
FIG. 36 is a cross-sectional view of the self-locking nail of FIG. 35, taken along line 36—36.
Figure 37:
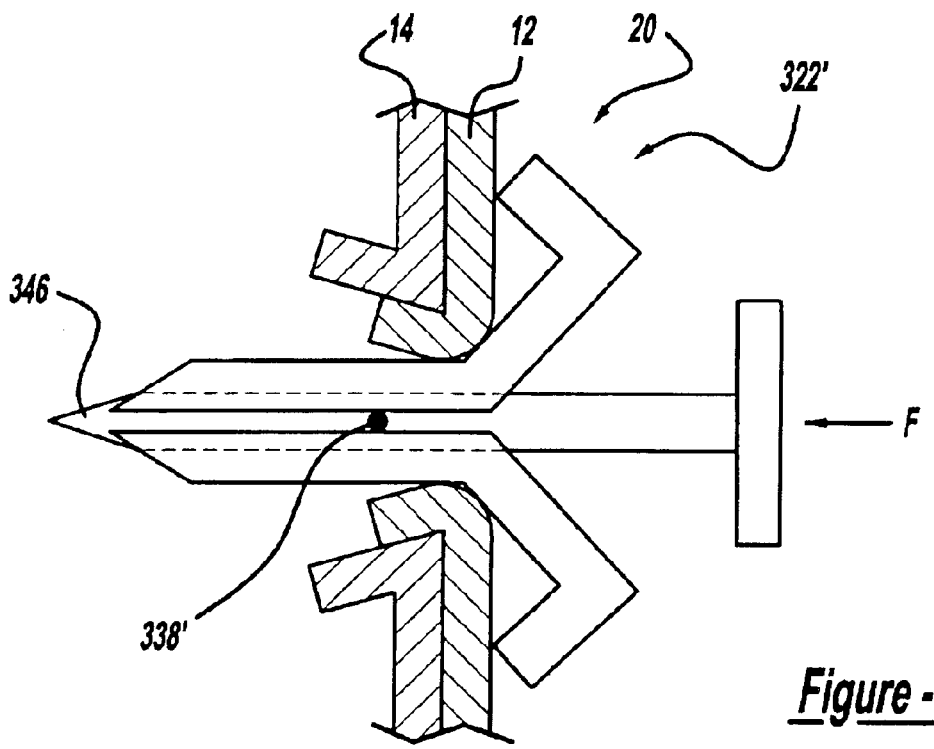
FIG. 37 is a cross-sectional view, taken along line 32—32 of FIG. 30, illustrating the self-locking nail of FIG. 35 partially piercing through two steel framing members.

When fastening framing members together with nail 322, tip 334 is positioned adjacent two or more adjacent steel framing members, such as framing members 12 and 14. Axial force F is applied to nail 322 which causes tip 334 and elongated portions 328 to penetrate through framing members 12 and 14, as shown in FIGS. 32–34. When angular portions 332 reach top surface 374 of framing member 12, continued application of driving force F causes angular portions 332 to move toward one another and elongated portions 328 to separate from one another due to the rigidity of first and second members 324 and 326 at the transition from elongated portions 328 to angular portions 332. As elongated portions 328 separate, any straps 336 and/or spot welds 338 coupling elongated portions 328 together also break. Straps 336 and spot welds 338 are designed to break in response to a separation of elongated portions 328 without impairing the ability of nail 322 to fasten framing members 12 and 14 together. When flange portions 330 are in contact with top surface 374 of framing member 12, driving force F can be removed and the engagement between elongated portions 328 and framing members 12 and 14 fastens framing members 12 and 14 between elongated portions 328 and flange portions 330. Nail 322 thereby fastens framing members 12 and 14 together with sufficient strength to meet the above stated requirements.

In a second preferred embodiment, locking nail 322', as shown in FIGS. 35–38, includes a driving member 340 that is positioned within a void 341 between adjacent elongated portions 328' and adjacent angular portions 332'. Specifically, in this embodiment elongated portions 328' and angular portions 332' have inner surfaces 342 that are concave and complementary to a cylindrical stem 344 of driving member 340. Stem 334 extends between a tip 346 and a head 348 of driving member 340. Tip 346 is configured to penetrate framing members 12 and 14 to facilitate fastening of framing members 12 and 14 with nail 322'. Head 348 is configured to receive driving force F to cause nail 322' to penetrate through framing members 12 and 14. Again, well known devices, such as an air nailer or ram-type device can be used apply driving force F to nail 322'. Elongated portions 328' are coupled to stem 344 of driving member 340 with spot welds 338' which allow driving member 340 to transmit driving force F to first and second members 324' and 326'.

Figure 38:
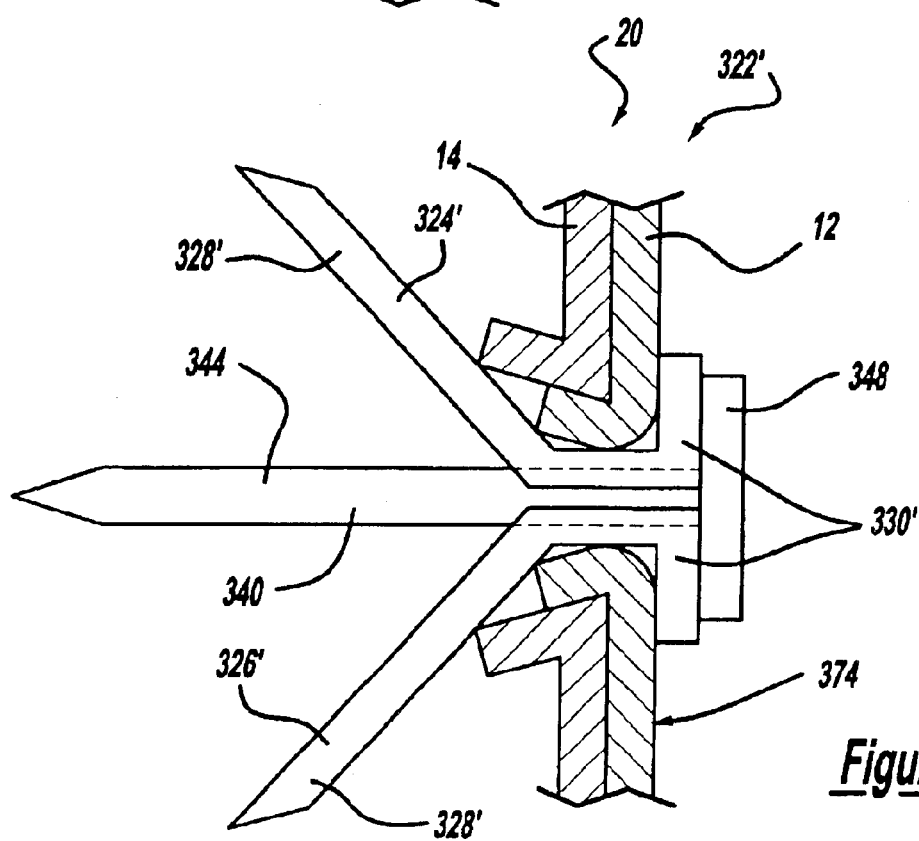
FIG. 38 is a cross-sectional view, taken along line 32—32 of FIG. 30, illustrating the self-locking nail of FIG. 35 fastening two steel framing members together.

In operation, tip 346 of driving member 340 is positioned adjacent two or more framing members 12 and 14 and driving force F is applied to head 348. Application of driving force F causes nail 322' to penetrate through framing members 12 and 14. As was stated above with reference to nail 322, elongated portions 328' separate and flange portions 330' move toward one another as nail 322' passes through framing members 12 and 14. Spot welds 338' break as angular portions 332' pass through framing members 12 and 14 and elongated portions 328' separate. As shown in FIG. 38, when flange portions 330' are in contact with top surface 374 of framing members 12, head 348 is positioned on flange portions 330' and elongated portions 328' are engaged with framing members 12 and 14. Nail 322' thereby fastens steel framing members 12 and 14 together with sufficient strength to meet the above stated requirements.

Nail 322, 322' can be made from a variety of materials. Preferably, nail 322, 322' is made from hardened steel. However, other materials, such as galvanized coated steel, titanium or other strong material having similar characteristics to hardened steel that enable nail 322, 322' to operate as described to fasten framing members 12 and 14 together can be utilized without departing from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A nail for fastening framing members comprising:
    a pair of finger members having opposite first and second ends with an axial length therebetween, said finger members being integral at said first end and forming a tip configured to pierce framing members, said finger members being spaced apart at said second end and forming a head configured to receive a driving force, and said finger members are substantially coplanar at said first end and twisted relative to one another at said second end;
    a slot between said finger members extending from said second end along a portion of said length toward said tip;
    a first set of teeth extending along a portion of a first finger member of said pair and projecting outwardly in a first direction; and
    a second set of teeth extending along a portion of a second finger member of said pair and projecting outwardly in a second direction, said second direction being substantially opposite said first direction.

2. The nail of claim 1, wherein said slot has a first section with a first width, a second section with a second width, and said first width is greater than said second width.

3. The nail of claim 2, wherein said second section of said slot is adjacent said second end.

4. The nail of claim 1, wherein each of said finger members has opposite first and second major surfaces separated by inner and outer sidewalls with said inner sidewalls facing one another and defining said slot, said first set of teeth extend along a portion of said first surface of said first finger member and said second set of teeth extend along a portion of said second surface of said second finger member.

5. The nail of claim 4, wherein a third set of teeth extend along a portion of said outer sidewall of said first finger member and a fourth set of teeth extend along a portion of said outer sidewall of said second finger member.

6. The nail of claim 1, wherein said slot has a generally uniform width.

7. The nail of claim 1, wherein each of said finger members has opposite first and second major surfaces separated by inner and outer sidewalls with said inner sidewalls facing one another and defining said slot, and said first set of teeth extend along a portion of said outer sidewall of said first finger member and said second set of teeth extend along a portion of said outer sidewall of said second finger member.

8. The nail of claim 1, wherein said first set of teeth are staggered from said second set of teeth.

9. The nail of claim 1, wherein each tooth of said sets of teeth extends outwardly from said fingers at a non-right angle relative to said axial length.

10. A nail for fastening framing members comprising:
    a pair of finger members having opposite first and second ends with an axial length therebetween, said finger members being integral at said first end and forming a tip configured to pierce framing members and said finger members being spaced apart at said second end and forming a head configured to receive a driving force;
    a slot between said finger members extending from said second end along a portion of said length toward said tip;
    a first set of teeth extending along a portion of a first finger member of said pair and projecting outwardly in a first direction; and
    a second set of teeth extending along a portion of a second finger member of said pair and projecting outwardly in a second direction, said second direction being substantially opposite said first direction,
    wherein each of said finger members has opposite first and second major surfaces separated by inner and outer sidewalls with said inner sidewalls facing one another and defining said slot, said first set of teeth extend along a portion of said first surface of said first finger member and said second set of teeth extend along a portion of said second surface of said second finger member, and
    said first and second sets of teeth extend respectively along portions of said first and second finger members directly from said inner sidewalls.

11. A method of fastening framing members together with a harpoon nail having first and second sets of teeth on respective first and second fingers joined at one end to form a tip and separated by a slot at the other end and forming a head, the sets of teeth projecting outwardly in directions substantially opposite one another, and the fingers being substantially coplanar at the first end and twisted relative to one another at the second end, the method comprising:
    (a) positioning a tip of the nail adjacent two or more adjacent framing members;
    (b) applying a driving force to the nail;
    (c) driving the nail through said framing members with said driving force until a head of the nail is in contact with one of said framing members;
    (d) elastically deforming twisted portions of the fingers toward a coplanar alignment as the nail is driven through said framing members; and
    (e) engaging at least one of said framing members with at least one tooth in at least one of the first and second sets of teeth thereby fastening the framing members together between said head and said at least one tooth.

12. The method of claim 11, wherein the fingers each have opposite first and second major surfaces separated by inner and outer sidewalls with said inner sidewalls facing one another and defining the slot, each of the sets of teeth extend along one of said major surfaces of one of the fingers and (d) includes engaging at least one of said framing members with said first and second sets of teeth.

13. The method of claim 12, wherein said first and second sets of teeth are adjacent said inner sidewalls of said first and second fingers respectively.

14. The method of claim 12, wherein third and fourth sets of teeth project outwardly from said outer sidewalls of the respective first and second fingers and (d) includes engaging at least one of said framing members with said third and fourth sets of teeth.

15. The method of claim 11, wherein the first and second fingers are resilient and (c) includes resiliently deforming the fingers of the nail as the nail is being driven through said framing members.

16. The method of claim 15, wherein (c) includes allowing the fingers to attempt to return to a nondeformed state after the nail has been driven through said framing members.

17. The method of claim 11, wherein (b) includes applying a driving force with a driving apparatus selected from the group consisting of an air nailer and ram-type device.

18. The method of claim 17, wherein (b) includes supporting a surface of said framing members opposite the nail with a back plate.

19. The method of claim 11, wherein teeth in the first set of teeth are axially staggered from teeth in the second set of teeth and (d) includes engaging at least one of said framing members with at least one of said staggered teeth.

20. The method of claim 11, wherein the fingers each have opposite major surfaces separated by inner and outer sidewalls, said inner sidewalls face one another and define the slot, the sets of teeth extend along the outer sidewalls of the fingers and (d) includes engaging at least one of said framing members with said first and second sets of teeth.

21. The method of claim 11, wherein the first and second sets of teeth project outwardly from the fingers non-orthogonally relative to an axial length of the nail and (d) includes engaging at least one of said framing members with said non-orthogonally projecting sets of teeth.

22. The method of claim 11, wherein (d) comprises elastically deforming twisted portions of the fingers with the framing members.

* * * * *